(12) United States Patent
Tanigawa et al.

(10) Patent No.: US 11,383,425 B2
(45) Date of Patent: Jul. 12, 2022

(54) FILAMENT WINDING DEVICE

(71) Applicant: Murata Machinery, Ltd., Kyoto (JP)

(72) Inventors: Motohiro Tanigawa, Kyoto (JP); Daigoro Nakamura, Kyoto (JP); Hirotaka Wada, Kyoto (JP); Tadashi Uozumi, Kyoto (JP); Hideo Shitamoto, Kyoto (JP); Tatsuhiko Nishida, Kyoto (JP); Masatsugu Goyude, Kyoto (JP); Tetsuya Matsuura, Kyoto (JP); Shu Ikezaki, Kyoto (JP)

(73) Assignee: Murata Machinery, Ltd., Kyoto (JP)

( * ) Notice: Subject to any disclaimer, the term of this patent is extended or adjusted under 35 U.S.C. 154(b) by 214 days.

(21) Appl. No.: 16/757,789

(22) PCT Filed: Sep. 26, 2018

(86) PCT No.: PCT/JP2018/035666
§ 371 (c)(1),
(2) Date: Apr. 21, 2020

(87) PCT Pub. No.: WO2019/093003
PCT Pub. Date: May 16, 2019

(65) Prior Publication Data
US 2021/0237334 A1     Aug. 5, 2021

(30) Foreign Application Priority Data

Nov. 10, 2017   (JP) .............................. JP2017-217457

(51) Int. Cl.
*B29C 53/58*   (2006.01)
*B29C 70/32*   (2006.01)
(Continued)

(52) U.S. Cl.
CPC ............ *B29C 53/58* (2013.01); *B29C 53/566* (2013.01); *B29C 53/8016* (2013.01);
(Continued)

(58) Field of Classification Search
None
See application file for complete search history.

(56) References Cited

U.S. PATENT DOCUMENTS 3,112,234 A * 11/1963 Krupp .................. B29C 53/602
156/169
4,172,562 A * 10/1979 Smith ................. B29C 53/8016
156/169
(Continued)

FOREIGN PATENT DOCUMENTS

CN      205439288 U     8/2016
EP      2 918 397 A1    9/2015
(Continued)

OTHER PUBLICATIONS

The First Office Action dated Jun. 17, 2021, counterpart of Chinese Application No. 201880066590.4, along with an English translation.
(Continued)

*Primary Examiner* — Jeffry H Aftergut
(74) *Attorney, Agent, or Firm* — DLA Piper LLP (US)

(57) ABSTRACT

A filament winding device includes: a supporting unit that supports a mandrel on which a plurality of fiber bundles impregnated with a resin are wound, the supporting unit movable in the axial direction of the mandrel; and a helical unit having a plurality of fiber bundle guide units arranged radially in the circumferential direction of the mandrel and guide the corresponding plurality of fiber bundles to the mandrel, the helical unit supplying the plurality of fiber bundles to the mandrel through the fiber bundle guide units. Each of the fiber bundle guide units has a pressing roller for pressing a fiber bundle supplied to the mandrel, against the circumferential surface moving in the axial direction. The pressing roller can come into the contact with the circumferential surface of the mandrel and be rotationally driven
(Continued)

about a roller axis extending in a roller axis direction perpendicular to the axial direction.

15 Claims, 18 Drawing Sheets

(51) Int. Cl.
    *B29C 53/56*     (2006.01)
    *B29C 53/80*     (2006.01)
    *B29C 70/54*     (2006.01)

(52) U.S. Cl.
    CPC .......... *B29C 53/8041* (2013.01); *B29C 70/32* (2013.01); *B29C 70/54* (2013.01)

(56) References Cited

U.S. PATENT DOCUMENTS 4,359,356 A * 11/1982 Kornbichler ............ B04B 7/085
    156/175
5,358,594 A * 10/1994 Darrieux ............... B29C 70/388
    156/433

FOREIGN PATENT DOCUMENTS

| | | |
|---|---|---|
| JP | 61-290038 A | 12/1986 |
| JP | 11-262955 A | 9/1999 |
| JP | 2004-291506 A | 10/2004 |
| JP | 2005-014346 A | 1/2005 |
| JP | 2007-216558 A | 8/2007 |
| JP | 2008-239939 A | 10/2008 |
| JP | 2009-119732 A | 6/2009 |
| JP | 2011-245780 A | 12/2011 |
| JP | 2013-078959 A | 5/2013 |
| JP | 2015-217527 A | 12/2015 |
| WO | 2014/073090 A1 | 5/2014 |

OTHER PUBLICATIONS

Notification of Reason for Refusal dated Oct. 14, 2020, of counterpart Korean Application No. 10-2020-7005990, along with an English translation.

* cited by examiner

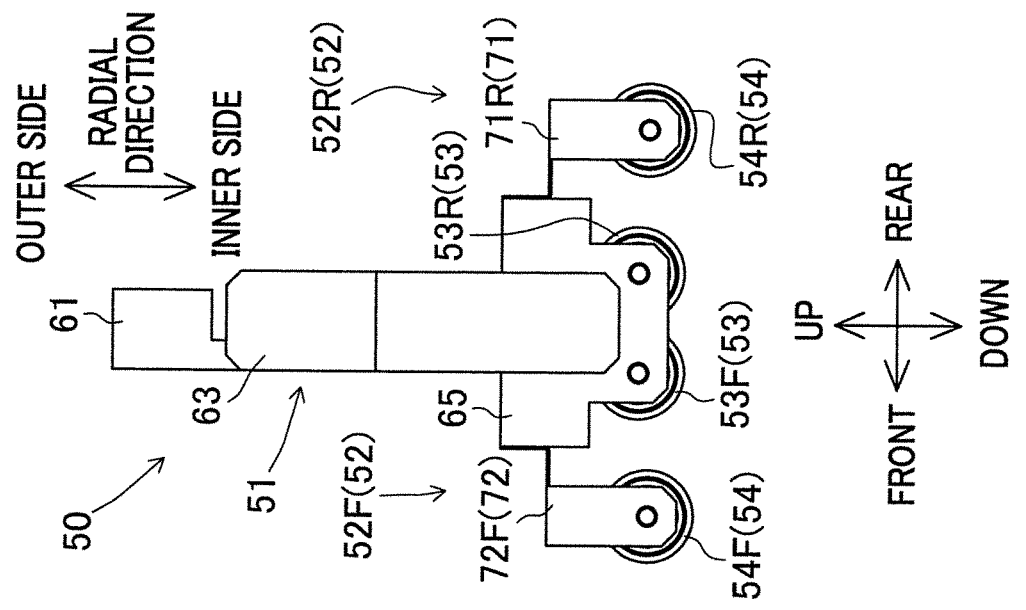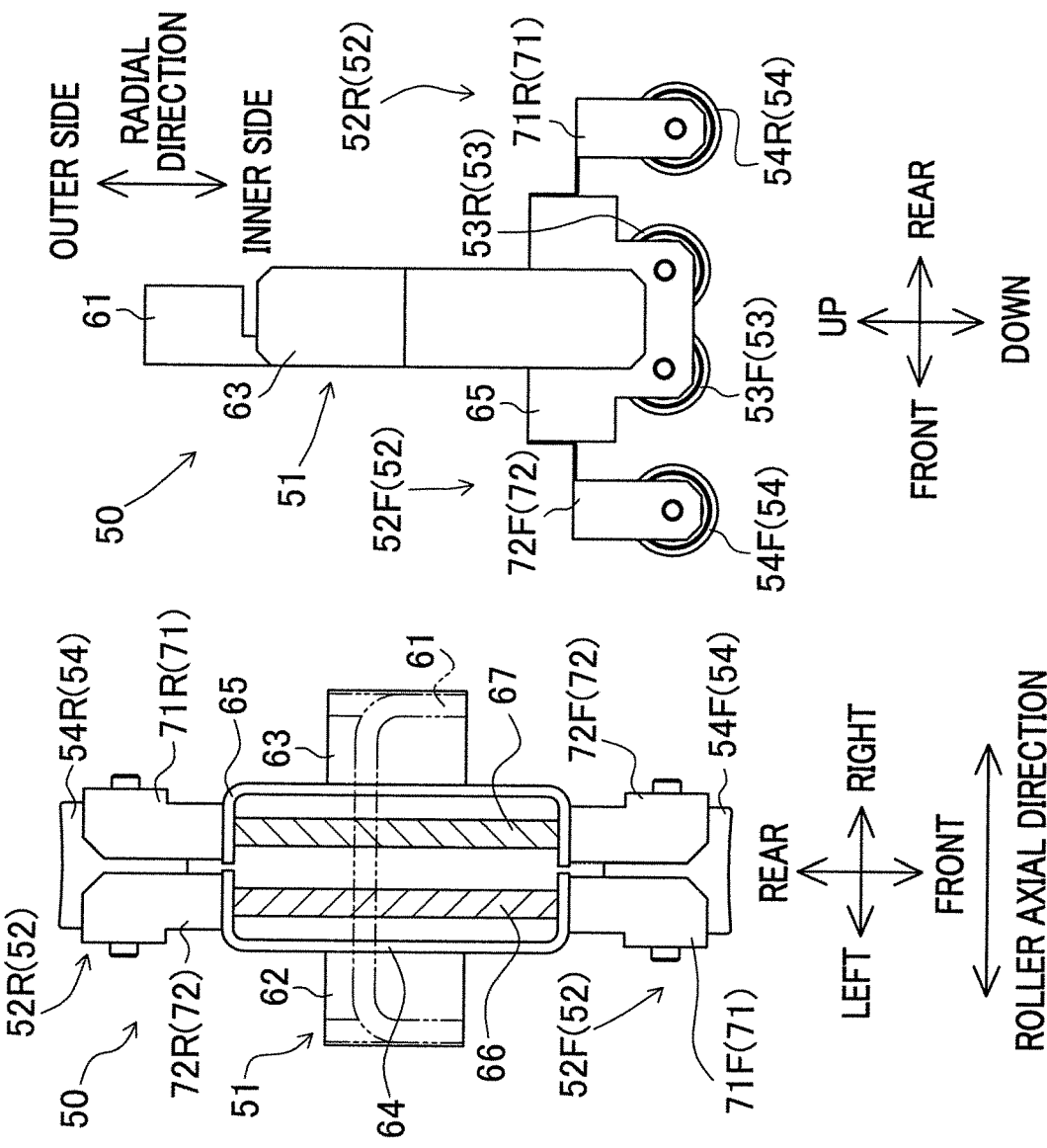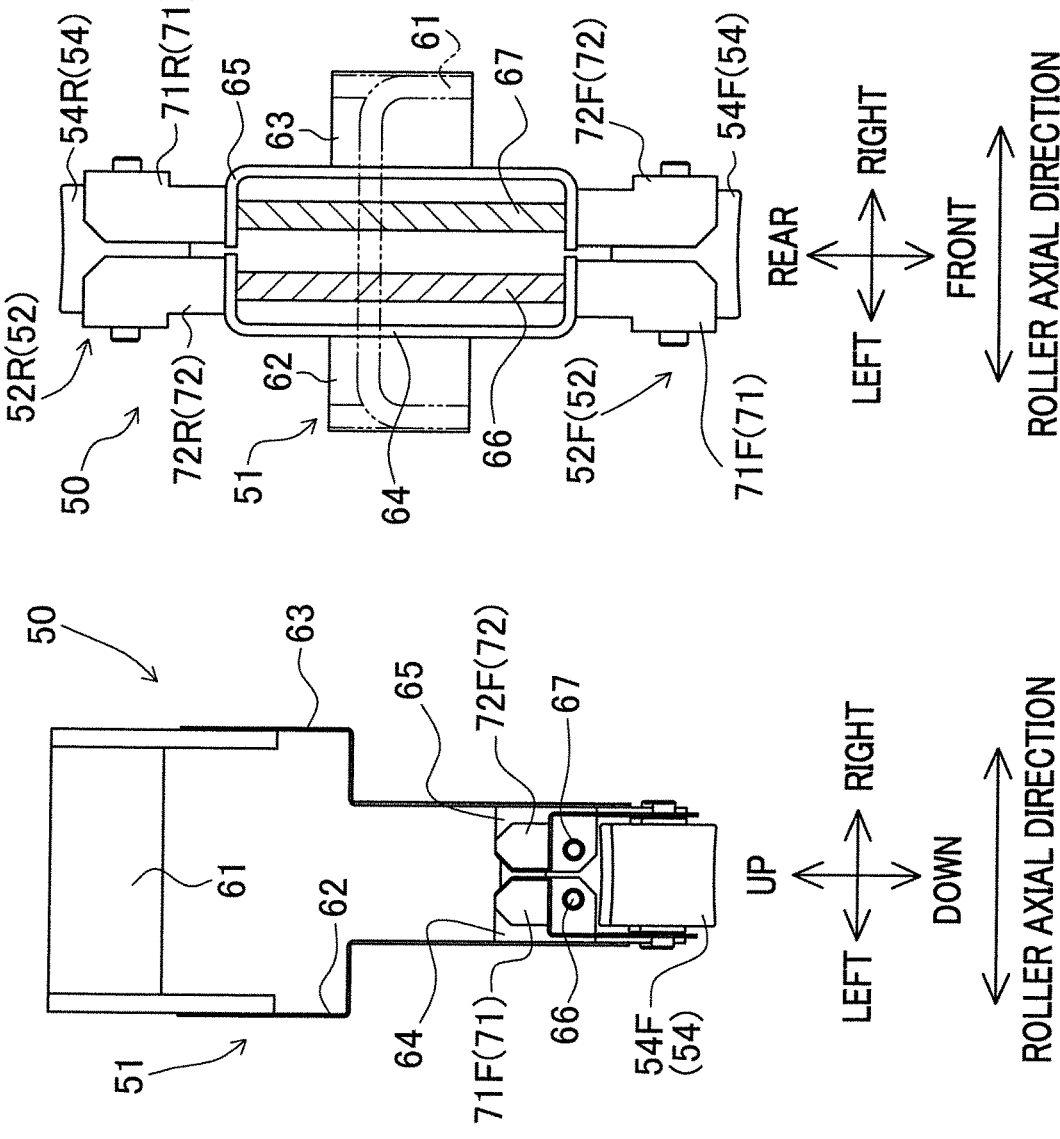

ROLLER AXIAL DIRECTION

ROLLER AXIAL DIRECTION

STICKING OF A FIBER BUNDLE
(WHEN A MANDREL MOVES FORWARD)

ATTACHING A RING GUIDE
(WHEN THE MANDREL MOVES FORWARD)

RETURNING

RETURNING HAS BEEN DONE

STICKING OF A FIBER BUNDLE (WHEN A MANDREL MOVES REARWARD)

ATTACHING A RING GUIDE (WHEN THE MANDREL MOVES REARWARD)

FURTHER RETURNING, AND THE MANDREL MOVES FORWARD AGAIN

FILAMENT WINDING DEVICE

TECHNICAL FIELD

This disclosure relates to a filament winding device which winds a fiber bundle to a liner.

BACKGROUND

In Japanese Laid-Open Patent Publication No. 2013-78959, a filament winding device that winds carbon fiber bundles impregnated with resin to a mandrel has been disclosed. The filament winding device includes a mandrel supporting table that supports the mandrel to be rotatable and movable in an axial direction (horizontal direction) of the mandrel, and a helical winding device that winds fiber bundles to the mandrel helically. In the state in which tip portions of the fiber bundles are fixed to the mandrel, the mandrel supporting table rotates and moves the mandrel in the axial direction. As a result, the fiber bundles are pulled out from the helical winding device and helically wound to the mandrel at the predetermined winding angle. Because the fiber bundles are wound to the mandrel which is rotating and moving, a predetermined tension is applied to the fiber bundles. A carbon roll which is made by winding fiber bundles to a cylindrical mandrel has characteristics such as lightness, high-strength, and high rigidity. Therefore, the carbon roll is used in many fields.

We found that a carbon roll having higher rigidity than known ones is obtained by, for example, forming fiber bundle layers using pitch carbon fiber bundles having high elasticity, as described below. To be more specific, we formed the following layers: a 0-degree oriented layer in which fiber bundles are stuck onto the mandrel to be substantially parallel to the axial direction of a mandrel; a +θ-degree oriented layer in which fiber bundles are wound to be tilted to one side relative to the axial direction of the mandrel; and a −θ-degree oriented layer in which fiber bundles are wound to be tilted to the other side relative to the axial direction of the mandrel. The carbon roll made in this way has high natural frequency because of high rigidity, and even when the carbon roll rotates at high speed, vibration is less likely to occur. Therefore, the carbon roll may be preferably used as a high speed rotary member such as a winding roll of an industrial machine such as a film manufacturing machine or a printing machine, and a propeller shaft of an automobile.

In that regard, to form the 0-degree oriented layer by the filament winding device recited in JP '959, the mandrel moves in the axial direction without rotating and, at the same time, the fiber bundles impregnated with resin need to be pulled out from a helical winding device and stuck onto the mandrel. However, when the mandrel is moved without being rotated, the fiber bundles are not wound to the mandrel. As a result, tension applied to the fiber bundles is low. On this account, the fiber bundle sags under its own weight, and the fiber bundle tends to be dislocated. In addition, sticking the fiber bundle onto target positions, e.g., a side portion or a bottom portion of the mandrel is difficult, with the result that forming the 0-degree oriented layer is difficult.

It could therefore be helpful to improve the stability of orientation of a fiber bundle when the fiber bundle is stuck onto the mandrel along the axial direction of the mandrel.

SUMMARY

Our filament winding device includes: a supporting unit that is able to support a mandrel on which fiber bundles impregnated with resin are wound and is able to move in an axial direction of the mandrel; and a helical unit including fiber bundle guide units disposed radially in a circumferential direction of the mandrel and guide the fiber bundles to the mandrel, respectively, the helical unit supplying the fiber bundles to the mandrel via the fiber bundle guide units, each of the fiber bundle guide units including at least one pressing roller which presses the fiber bundle supplied to the mandrel on a circumferential surface of the mandrel which is moving in the axial direction, and the at least one pressing roller being passively rotatable about a roller axis extending in a roller axial direction orthogonal to the axial direction, by making a contact with a circumferential surface of the mandrel.

As the fiber bundle is pressed on the circumferential surface of the mandrel by the pressing roller of the fiber bundle guide unit, the fiber bundle is stuck on the mandrel by the viscosity of resin. Because of this, even when the mandrel does not rotate and tension applied to the fiber bundle is low, the fiber bundle can be stuck on the mandrel before the fiber bundle supplied to the mandrel sags. As a result, the fiber bundle is easily stuck on a target position. Therefore, the fiber bundle is easily stuck to the mandrel along the axial direction of the mandrel.

In the filament winding device above, each of the fiber bundle guide units may further include a tension receiving member placed upstream of the at least one pressing roller in a fiber bundle running direction and receives tension of the fiber bundle not pressed on the mandrel yet.

Even when the fiber bundle is stuck on the mandrel without rotation of the mandrel, a certain degree of tension is applied to the fiber bundle supplied to the mandrel because the mandrel moves in the axial direction. Because the tension functions as to lift the pressing roller from the mandrel, pressing force of the pressing roller pressing the fiber bundle on the mandrel may be decreased, if the tension is directly applied the pressing roller. The tension applied to the fiber bundle is received by a tension receiving member placed upstream of the pressing roller. Because of this, the tension is suppressed from being directly applied to the pressing roller placed downstream of the tension receiving member so that the pressing force of the pressing roller is suppressed from becoming low.

In the filament winding device just above, the tension receiving member may be a roller.

For example, when the fiber bundle which is broken easily (such as a pitch carbon fiber bundle is equivalent to this) and stuck on the mandrel, the fiber bundle may be broken due to friction with the tension receiving roller when the tension receiving member is fixed. Because the fiber bundle runs smoothly along a roller, the fiber bundle is suppressed from being broken.

In the filament winding devices above, the helical unit further includes a guide movement mechanism that moves each of the fiber bundle guide units in a radial direction of the mandrel.

The positions of the fiber bundle guide units in the radial direction are adjusted in accordance with the outer diameter of the mandrel so that the fiber bundles are pressed on the circumferential surface of the mandrel with various diameters by the pressing roller.

The supporting unit may be able to reciprocate in the axial direction, and each of the fiber bundle guide units includes two or more pressing rollers, and as the two or more pressing rollers, a first pressing roller that presses the fiber bundle on the circumferential surface of the mandrel when the supporting unit moves toward one side in the axial direction and a second pressing roller placed on the other side than the first pressing roller in the axial direction and presses the fiber bundle on the circumferential surface of the mandrel when the supporting unit moves toward the other side in the axial direction are provided.

In a structure in which the supporting unit is able to reciprocate, the fiber bundle can be pressed on the circumferential surface of the mandrel by a first pressing roller when the mandrel moves toward one side in the axial direction, and pressed on the circumferential surface of the mandrel by a second pressing roller when the mandrel moves toward the other side. Because of this, the fiber bundle is stuck on the mandrel both when the mandrel moves forward and when the mandrel moves rearward. Therefore, the fiber bundle is efficiently stuck on the mandrel.

The mandrel may have a cylindrical shape extending in the axial direction, and the at least one pressing roller includes, in cross section including an axis of the at least one pressing roller, a reduced diameter part which is curved so that the diameter decreases toward the center in the roller axial direction.

For example, when the pressing roller is cylindrical in shape, the fiber bundle may not be stuck on the circumferential surface of the mandrel successfully because a contact area between the pressing roller and the mandrel having the curving circumferential surface is small. Because the reduced diameter part is facilitated to correspond to the circumferential surface of the mandrel, the contact area between the pressing roller and the mandrel circumferential surface is increased. Therefore, the fiber bundle is stably stuck on the circumferential surface of the mandrel.

In the filament winding device just above, in the at least one pressing roller, roller end parts may be formed at outer sides of the reduced part in the roller axial direction, respectively, and in the cross section of the at least one pressing roller, in a radial direction of the at least one pressing roller, the roller end parts are inside tangents to an outer edge of the reduced diameter part at ends in the roller axial direction, respectively, and an angle formed between each outer edge of the roller end parts and the outer edge of the reduced diameter part is an obtuse angle.

When the reduced diameter part is formed to reach the end in the roller axial direction, in the cross section of the pressing roller, an angle formed between an end face in the roller axial direction and the outer edge of the reduced diameter part is an acute angle (acute) so that described-below problems may happen. In the circumferential direction of the mandrel, when the fiber bundle has already been stuck on another position different from a position on which the fiber bundle is being stuck, the fiber bundle may be peeled off by the end portion of the pressing roller when the end portion of the pressing roller makes a contact with the fiber bundle on the another position described above.

The angle formed between each of the outer edges of the roller end parts and the outer edge of the reduced diameter part is an obtuse angle. In other words, the end portion and its surroundings of the reduced diameter part have a more gradual shape compared to when the reduced diameter part (part likely to make a contact with the fiber bundle) is formed to reach the end in the roller axial direction. Because of this, even when the end portion of the reduced diameter part in the roller axial direction contacts the fiber bundle that has already been stuck on the mandrel, the fiber bundle is less likely to be peeled off.

In the filament winding device just above, the roller end parts may be rectangular in cross section.

Because the roller end parts are rectangular in cross section (i.e., the roller end portion is cylindrical, and the diameter of the roller end portion is consistent), processing in manufacture can be easily done.

Each of the fiber bundle guide units may further include: a roller supporter supporting the at least one pressing roller to be rotatable; and a guide supporter to which the roller supporter is attached, and the roller supporter includes a cushioning member absorbing variation of pressing force of pressing the at least one pressing roller on the mandrel.

Even when the pressing force of the pressing roller is changed by some reasons such as small roughness on the circumferential surface of the mandrel or small vibration of the supporting unit, the variation of the pressing force is absorbed by the cushioning member. Therefore, the following problems can be suppressed: the fiber bundle is not stuck on the mandrel successfully because the pressing force is decreased too much; and pressure to, e.g., the pressing roller becomes excessive because the pressing force becomes excessive.

In the filament winding device just above, the roller supporter may include, as the cushioning member, a plate spring member supporting the at least one pressing roller to be rotatable.

The plate spring member can support the pressing roller and absorb the variation of the pressing force of the pressing roller at the same time. In other words, it is unnecessary to individually provide a member to support a pressing roller and a cushioning member. Therefore, an increase in the number of components and cost growth are suppressed.

The roller supporter may support the at least one pressing roller at both sides.

When the pressing roller is cantilevered, an end portion that is not supported tends to be displaced greatly compared to an end portion that is supported, in the roller axial direction. Therefore, the roller axis of the pressing roller tends to be tilted with respect to the circumferential surface of the mandrel, with the result that the fiber bundle may not be stably stuck on the mandrel. Because the pressing roller is supported at both sides, the one end portion of the pressing roller in the roller axial direction is suppressed from being displaced greatly compared to the other end portion. As a result, the pressing roller is suppressed from being tilted with respect to the circumferential surface of the mandrel. Therefore, the fiber bundle is stably stuck on the mandrel.

The winding device may further comprise a controller controlling the supporting unit and, after the controller moves the supporting unit to the one side in the axial direction to stick the fiber bundles to reach an end portion on the other side from an end portion of one side in the axial direction of the mandrel, the controller moves the supporting unit further to the one side in the axial direction so that a part of each of the fiber bundles supplied to the mandrel juts out from the end portion on the other side of the mandrel, and the controller moves the supporting unit back to the other side in the axial direction, in a state in which jut-out parts of the fiber bundles jutting out from the end portion of the mandrel are enclosed by an annular returning guide tool.

In a structure in which the supporting unit is able to reciprocate, it is preferable in consideration of the production efficiency that the fiber bundle stuck to reach the end of the mandrel is returned in the axial direction without being cut so that the fiber bundle is continuously stuck onto the mandrel. However, when the fiber bundle is stuck to reach the end portion of the mandrel and then the fiber bundle is returned by moving the mandrel in the opposite direction, the fiber bundle stuck onto the end portion of the mandrel may be pulled in the axial direction and peeled off by the tension applied to the fiber bundle.

The controller performs control such that, after the fiber bundle is stuck on the mandrel as the supporting unit is moved to one side in the axial direction, a part of each fiber bundle is arranged to jut out from the end portion on the other side of the mandrel. Subsequently, when the jut-out parts of the fiber bundles are enclosed by the annular returning guide tool, the supporting unit is moved back to the other side. As a result, the fiber bundles are returned to the other side while being guided outward from the inner side in the radial direction of the ring tool. The supporting unit moves further to the other side, with the result that the returning guide tool is pulled toward the mandrel by the tension of the fiber bundle. By using the returning guide tool with a proper size corresponding to the size of the mandrel, the returning guide tool which is pulled is received by the end face of the mandrel by making a contact therewith. Therefore, even when the returning fiber bundle is pulled in the axial direction, the fiber bundle is received by the returning guide tool. As a result, the fiber bundle is suppressed from being peeled off from the mandrel. As the supporting unit is further moved to the other side, the sticking of the fiber bundle can be continued. Therefore, the fiber bundle is continuously stuck on the mandrel by the reciprocal movement of the mandrel.

In the filament winding device just above, the returning guide tool may be separated into guide pieces in a circumferential direction of the returning guide tool.

For example, the fiber bundles can be enclosed by using a returning guide tool in which a narrow slit is formed from the outer side in the radial direction to the inner side and guiding the fiber bundles to the inner side in the radial direction of the tool, for example, by hand. However, in this configuration, when the fiber bundles are threaded into the slit, the fiber bundles may get damaged by making a contact with the slit of the returning guide tool. By connecting guide pieces and forming the returning guide tool, it is possible to enclose the fiber bundles from the outer side in the radial direction of the tool. In other words, because it is unnecessary to thread the fiber bundles into the slit to enclose the fiber bundles, damage to the fiber bundles is suppressed.

The returning guide tool may be ring-shaped.

For example, the fiber bundles can be enclosed by a returning guide tool that is polygonal in shape in the circumferential direction. However, when such a guide tool is used, the fiber bundles may get damaged by, e.g., hitting on a corner of the returning guide tool. Because the returning guide tool is ring-shaped (i.e., has a smooth shape on the whole), damage to the fiber bundles is suppressed.

The maximum outer diameter of the returning guide tool may be shorter than the outer diameter of the mandrel.

When the returning guide tool encloses the fiber bundles, the returning guide tool is suppressed from jutting outward compared to the mandrel in the radial direction. Therefore, when the supporting unit is returned to the other side, the returning guide tool is suppressed from interfering with, e.g., the pressing roller of the helical unit.

BRIEF DESCRIPTION OF THE DRAWINGS

FIGS. 6A to 6C are a front view, plan view, and side view of the fiber bundle guide unit, respectively.

REFERENCE SIGNS LIST

Figure 1:
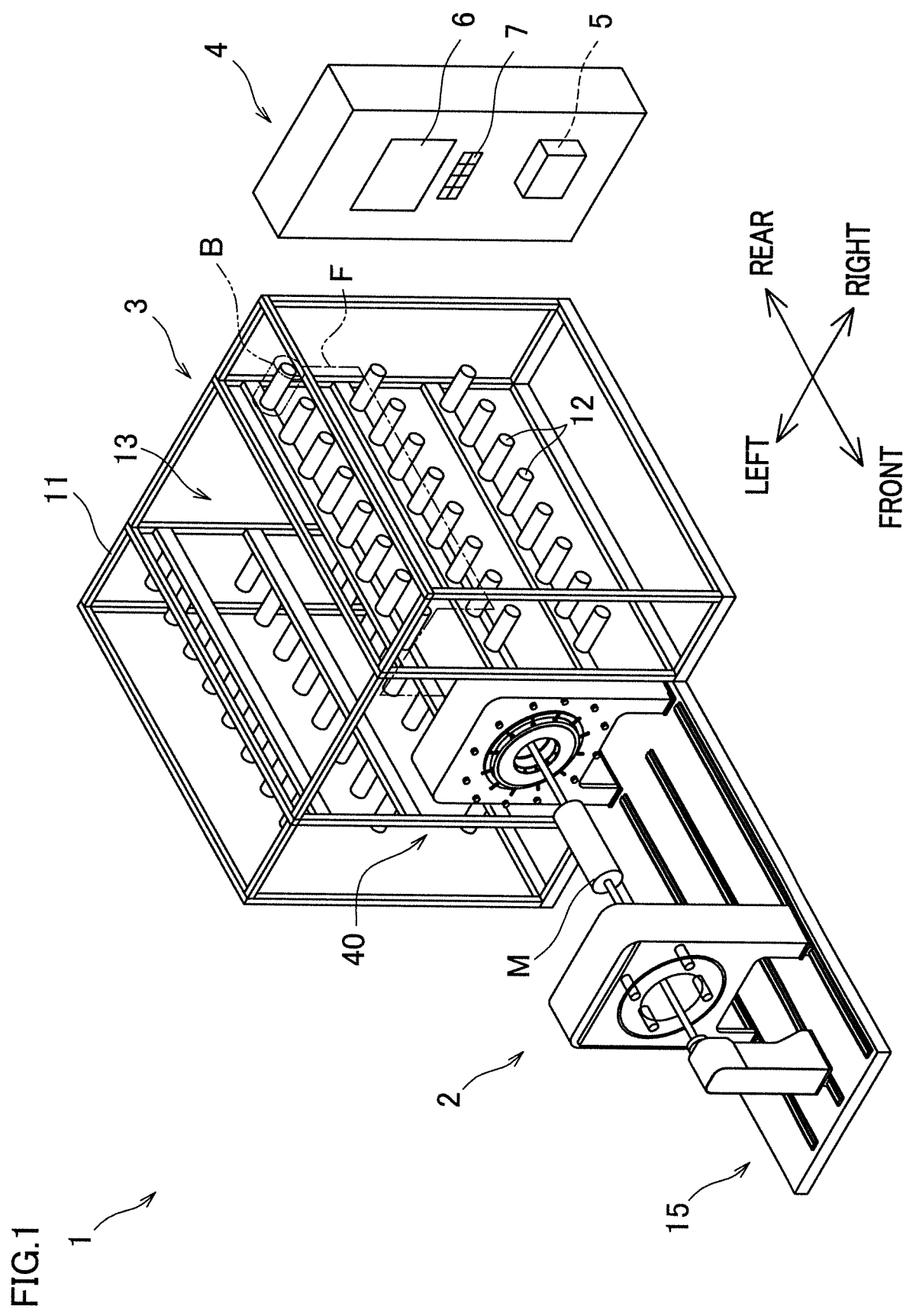
FIG. 1 is a perspective view of a filament winding device related to an example.

1 filament winding device
5 controller (controller)
20 supporting unit
40 helical winding unit (helical unit)
50 fiber bundle guide unit
51 guide supporter
52 pressing roller supporter (roller supporting unit)
53 widening roller (tension receiving member)
54 pressing roller
54F pressing roller (first pressing roller)
54R pressing roller (second pressing roller)
55a reduced diameter part
55b roller end part
55c roller end part
55d outer edge
55e outer edge
71 plate spring member (cushioning member)
72 plate spring member (cushioning member)
80 guide movement mechanism
101 tangent
200 ring guide (returning guide tool)
C axis
F fiber bundle
Fa jut-out part
M mandrel

DETAILED DESCRIPTION

The following will describe an example with reference to FIG. 1 to FIG. 16C. Directions shown in FIG. 1 are defined as a front-rear direction and a left-right direction, for convenience of explanation. Furthermore, a direction orthogonal to the front-rear direction and the left-right direction is defined as the up-down direction in which gravity acts.

Filament Winding Device

To begin, the following will describe a schematic structure of a filament winding device 1 with reference to FIG. 1.

The filament winding device 1 includes a winder 2, a creel stand 3, and a control panel 4.

The winder 2 winds fiber bundles F to a mandrel M. The fiber bundles F are, for example, made by impregnating fiber materials such as highly elastic carbon fibers termed pitch carbon fiber bundles with thermosetting synthetic resin. The pitch carbon fiber bundles are highly elastic but easily broken. The mandrel M is a core material for manufacturing, e.g., a propeller shaft of an automobile, and has a cylindrical shape. The details of the winder 2 will be given later.

The creel stand 3 supplies the fiber bundles F to a helical winding unit 40 (helical unit) described below. The creel stand 3 includes a supporting frame 11 and bobbin supporters 12 which are supported by the supporting frame 11. The supporting frame 11 is roughly left-right symmetric, and at a central portion of the supporting frame 11 in the left-right direction, an installation space 13 where a part of the winder 2 is provided is formed (in this regard, the details of the installation space 13 are omitted). By the bobbin supporters 12, bobbins B are supported to be rotatable, respectively. On the bobbins B, the fiber bundles F supplied to a helical winding unit 40 are wound.

The control panel 4 includes a controller 5, a display 6, and an operation unit 7. The controller 5 controls an operation of each part of the winder 2. The display 6 displays, e.g., a winding condition of the fiber bundle that is wound to the mandrel M by the winder 2. The operation unit 7 inputs, e.g., the winding condition of the winder 2 in the controller 5 by an operator.

Winder

Figure 2:
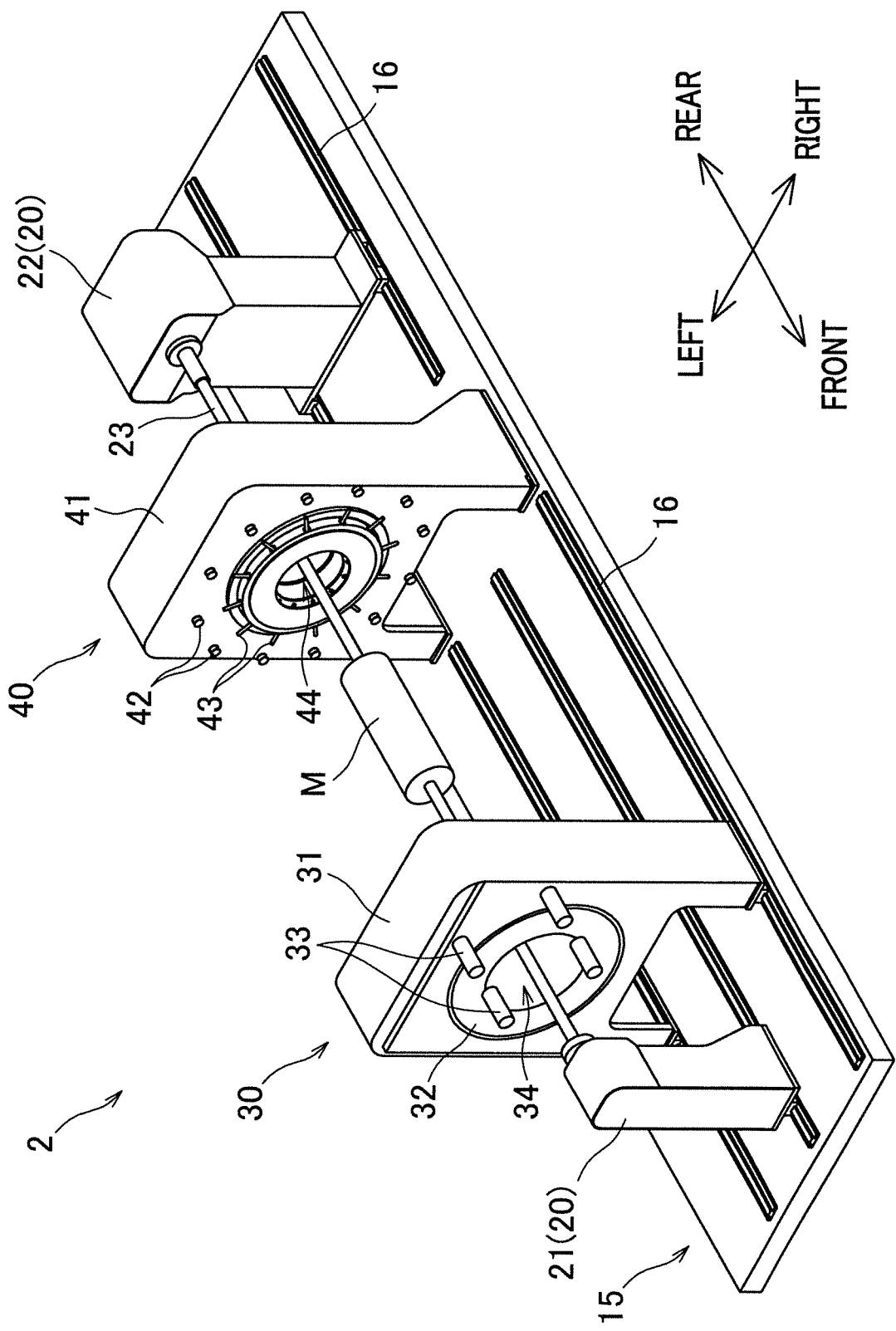
FIG. 2 is a perspective view of a winder.

The structure of the winder 2 will be described with reference to FIGS. 2 and 3. The winder 2 includes a base 15, supporting units 20 (first supporting unit 21 and second supporting unit 22), a hoop winding unit 30, and the helical winding unit 40.

The base 15 supports the supporting units 20, the hoop winding unit 30, and the helical winding unit 40. The base 15 extends in the front-rear direction. On the base 15, the first supporting unit 21, the hoop winding unit 30, the helical winding unit 40, and the second supporting unit 22 are placed in this order from a front side in the front-rear direction. On a top surface of the base 15, rails 16 are provided to extend in the front-rear direction. The supporting units 20 and the hoop winding unit 30 are placed on the rails 16 to be movable in the front-rear direction along the rails 16. Meanwhile, the helical winding unit 40 is, at the front end portion of the installation space 13 of the creel stand 3, fixed to the base 15 as shown in FIG. 1.

The supporting units 20 include the first supporting unit 21 placed in front of the hoop winding unit 30, and the second supporting unit 22 placed behind the helical winding unit 40. The supporting units 20 support the mandrel M to be rotatable about a supporting shaft 23 extending in the axial direction (front-rear direction) of the mandrel M. The supporting units 20 include a moving motor 24 that moves the supporting units 20 in the front-rear direction along the rail 16, and a rotating motor 25 that rotates the mandrel M as shown in FIG. 3. The moving motor 24 and the rotating motor 25 are driven and controlled by the controller 5.

The hoop winding unit 30 performs hoop-winding of the fiber bundles to the mandrel M (winding the fiber bundles in a direction roughly orthogonal to the axial direction of the mandrel M). The hoop winding unit 30 includes a main body 31 and a rotating member 32. The main body 31 is placed on the rails 16, and supports the rotating member 32 to be rotatable about an axis of the mandrel M. The rotating member 32 is a disc-shaped member. At a central portion in a radial direction of the rotating member 32, a passing hole 34 through which the mandrel M can pass is formed. To the hoop winding unit 30, bobbins 33 to each of which the fiber bundle is wound are attached. The bobbins 33 are placed at regular intervals in a circumferential direction of the rotating member 32.

Figure 3:
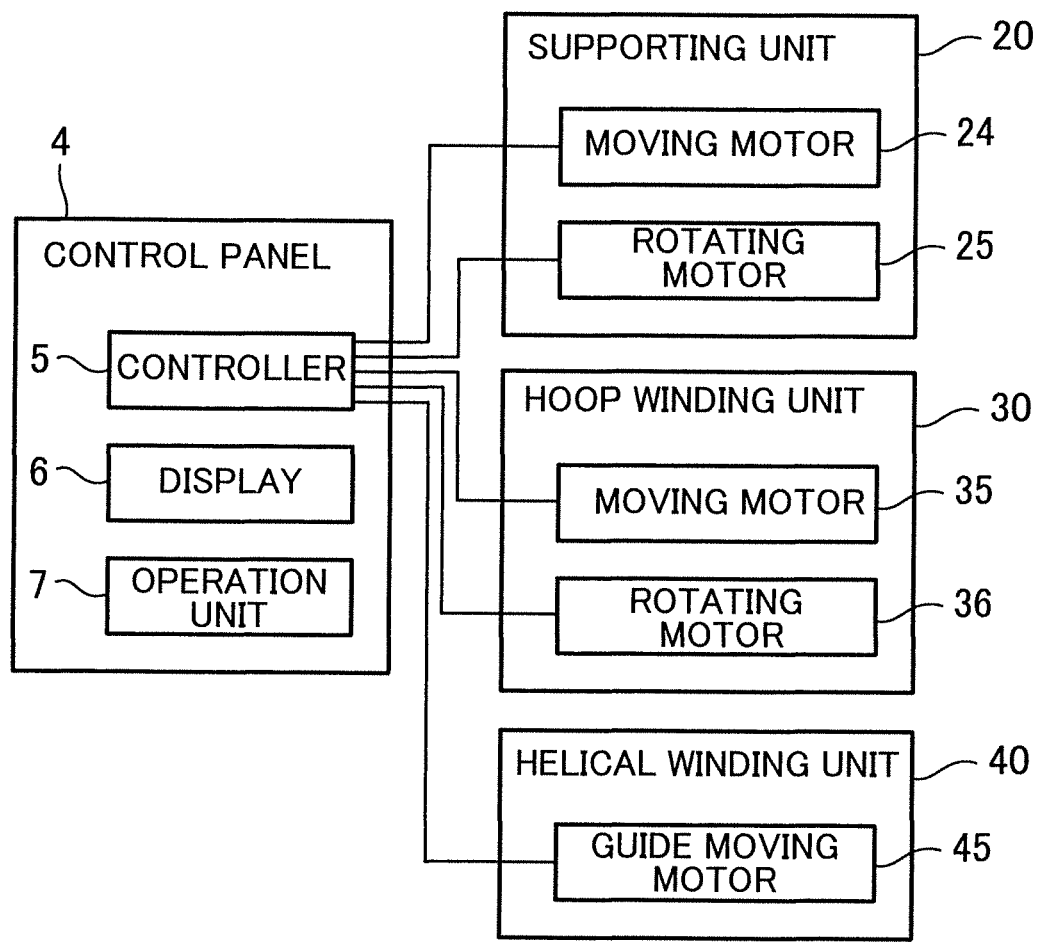
FIG. 3 is a block diagram showing an electrical structure of the filament winding device.

The hoop winding unit 30 includes, as shown in FIG. 3, a moving motor 35 that moves the hoop winding unit 30 in the front-rear direction along the rails 16, and a rotating motor 36 that rotates the rotating member 32. The moving motor 35 and the rotating motor 36 are driven and controlled by the controller 5. The controller 5 rotates the rotating member 32 while reciprocating the hoop winding unit 30 along the rails 16 so that the mandrel M passes through the passing hole 34 relatively. Because of this, the bobbins 33 are revolved about the axis of the mandrel M, and the fiber bundles are pulled out from the bobbins 33. The fiber bundles pulled out are simultaneously hoop-wound on the surface of the mandrel M.

The helical winding unit 40 winds the fiber bundles F helically to the mandrel M (winds the fiber bundles in a direction roughly parallel to the axial direction of the mandrel M), and is able to form a 0-degree oriented layer described below on the mandrel M. The helical winding unit 40 includes a main body 41, guides 42, nozzles 43, and a tension applying device (not illustrated). The main body 41 is vertically placed on the base 15. At a central portion of the main body 41 in the left-right direction, a circular passing hole 44 through which the mandrel M can pass in the front-rear direction is formed. Along a circumferential direction of the passing hole 44, the guides 42 and the nozzles 43 (in this example, twelve guides and twelve nozzles) are placed. When normal helical winding is performed, the fiber bundles pulled out from the bobbins B placed at the creel stand 3 are guided to the nozzles 43 via the guides 42. Each of the nozzles 43 extends along a radial direction of the mandrel M, and guides the fiber bundle F to the inner side from the outer side in the radial direction. Each of the nozzles 43 is extendable and contractible in the radial direction by a later-described guide movement mechanism 80 as shown in FIG. 8.

The helical winding unit 40 includes, as shown in FIG. 3, a guide moving motor 45 that extends and contacts the nozzles 43. The guide moving motor 45 is driven and controlled by the controller 5. The controller 5 extends and contracts the nozzles 43 in accordance with the outer shape of the mandrel M while reciprocating the supporting units 20 along the rails 16 so that the mandrel M passes through the passing hole 44. As a result, the fiber bundles F pulled out from the nozzles 43 are simultaneously wound helically to the surface of the mandrel M. Because the fiber bundles F are wound to the mandrel M which is rotating and moving, a predetermined tension is applied to the fiber bundles F by the tension applying device (not illustrated).

To start winding of the fiber bundles to the mandrel M by the winder 2, to begin with, for example, an operator fixes yarn ends of the fiber bundles to the mandrel M by, e.g., tapes. Alternatively, a device for automatically fixing the yarn ends of the fiber bundles may be used. After the yarn ends of the fiber bundles are fixed to the mandrel M, the controller 5 drives and controls the motors 24, 25, 35, 36, and 45 as shown in FIG. 3 so that, to the mandrel M supported by the supporting units 20, the hoop-winding is performed by the hoop winding unit 30 and the helical winding is performed by the helical winding unit 40. As a result, a carbon roll in which the fiber bundles are wound to the mandrel M is made. The carbon roll has characteristics such as lightness and high rigidity.

We found that a carbon roll having higher rigidity than known ones is obtained by forming layers of fiber bundles F, for example, by using the above-described pitch carbon fiber bundles, as described below. To be more specific, we formed the following layers: a 0-degree oriented layer in which fiber bundles F are stuck onto a mandrel M to be substantially parallel to the axial direction of the mandrel M; a +θ-degree oriented layer in which the fiber bundles F are wound to be tilted to one side relative to the axial direction of the mandrel M; and a −θ-degree oriented layer in which the fiber bundles F are wound to be tilted to the other side relative to the axial direction of the mandrel M.

To form the 0-degree oriented layer, it is necessary to pull the fiber bundles F out from the helical winding unit 40 and stick them onto the mandrel M while moving the mandrel M in the front-rear direction without rotating the same. However, when the mandrel M is moved without being rotated, the tension applied to the fiber bundles F is low as compared to when the normal helical winding described above is performed (i.e., when the fiber bundles F are wound to the mandrel M while the mandrel M is rotating and moving). Therefore, the fiber bundle F may easily sag under its own weight, and sticking the fiber bundle onto the target positions, e.g., the side portion or the bottom portion of the mandrel may be difficult. The helical winding unit 40 includes a structure described below to facilitate sticking of the fiber bundles F onto the mandrel M along the front-rear direction.

0-Degree Oriented Layer

Figure 4:
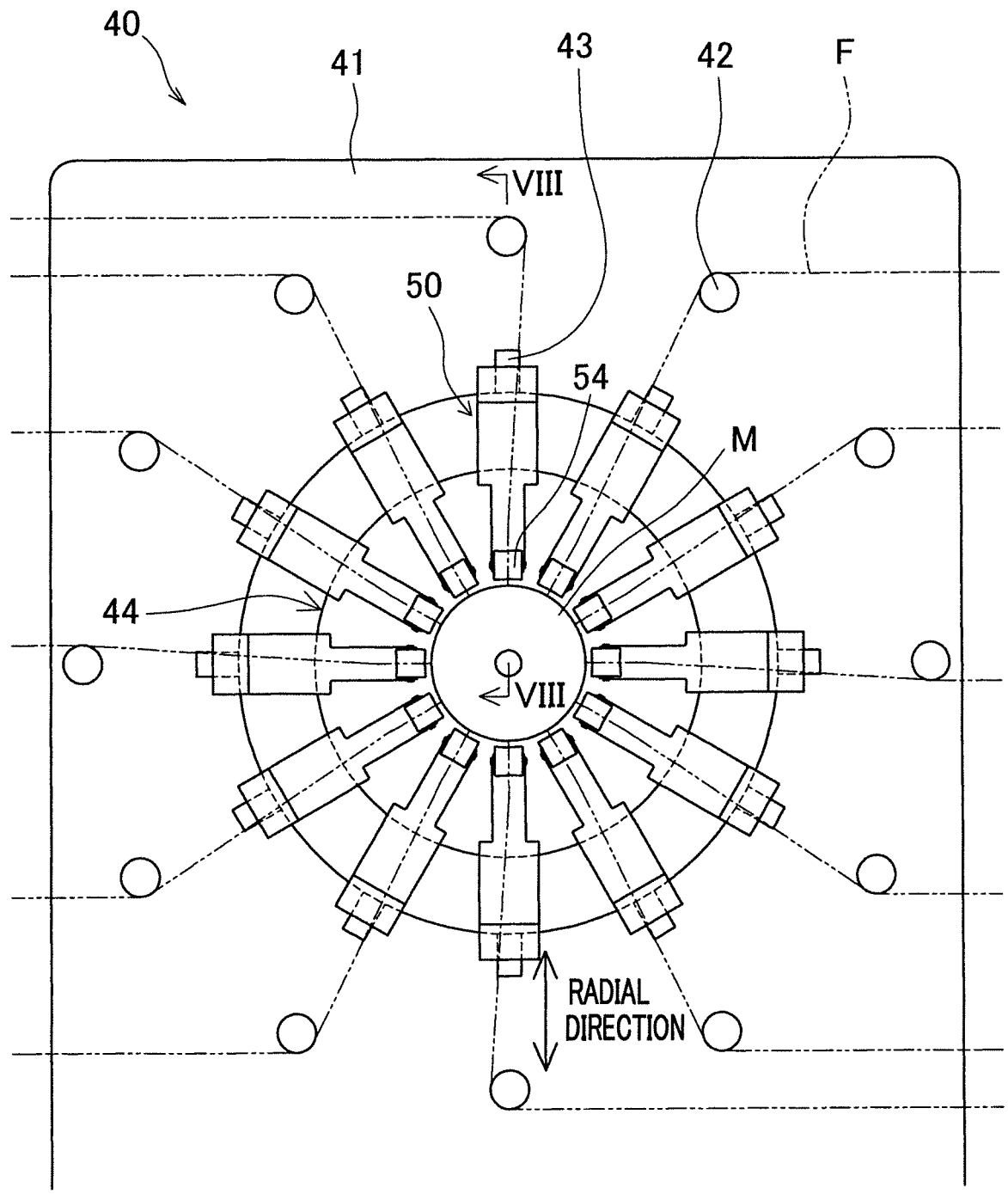
FIG. 4 is a front view of an upper part of a helical winding unit.
Figure 5:
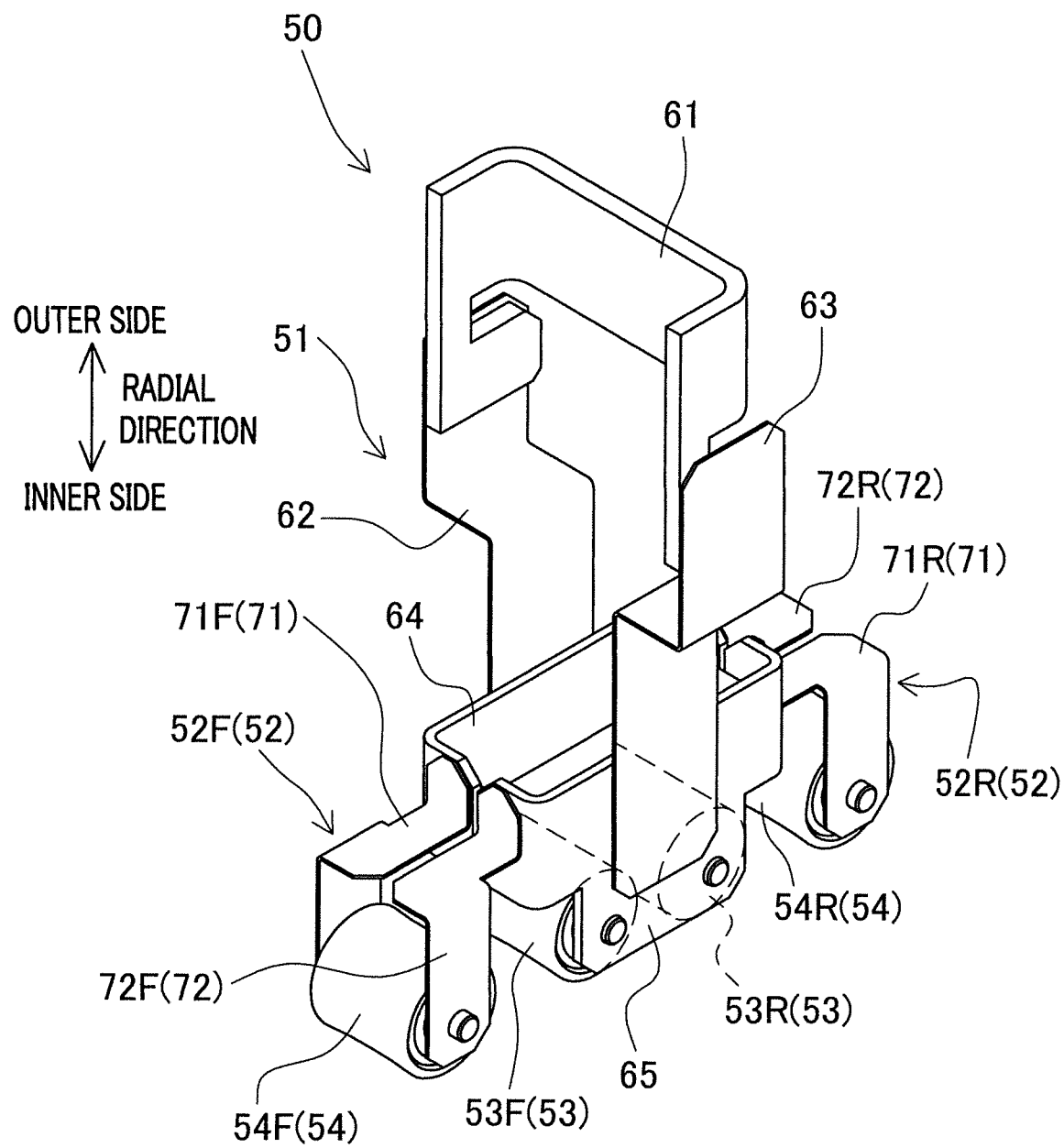
FIG. 5 is a perspective view of a fiber bundle guide unit.
Figure 7:
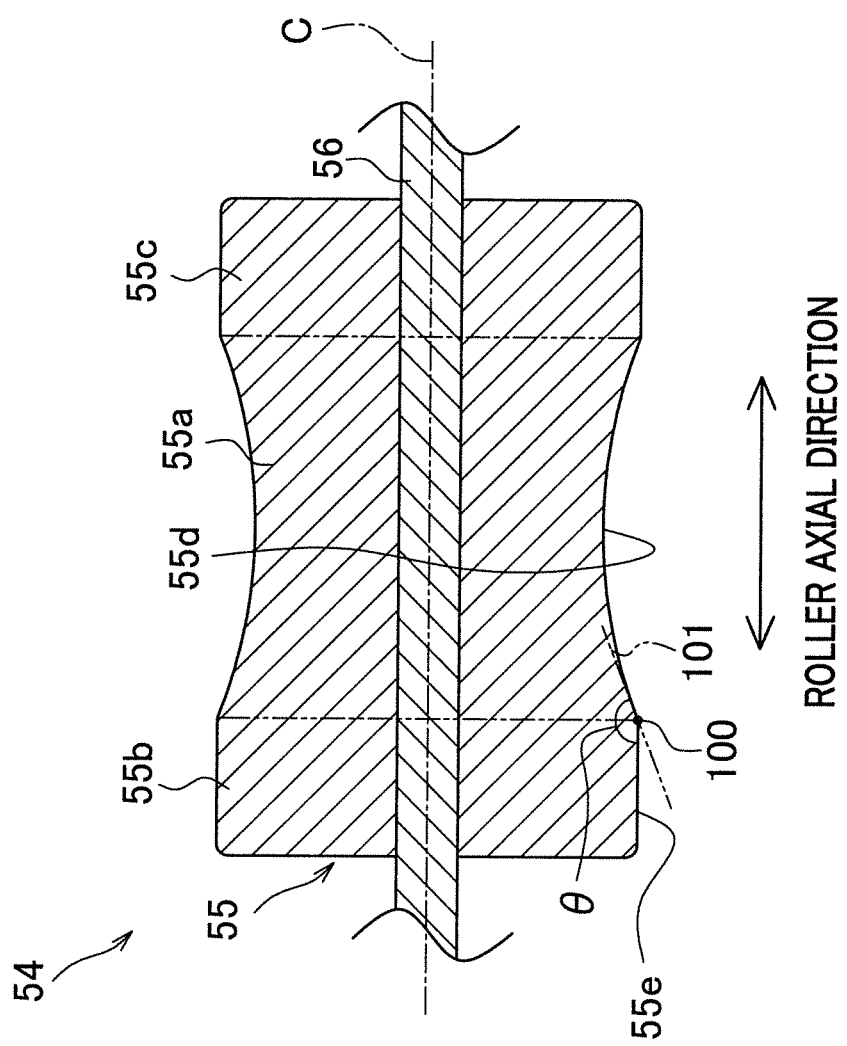
FIG. 7 is a cross section of a pressing roller.
Figure 8A:
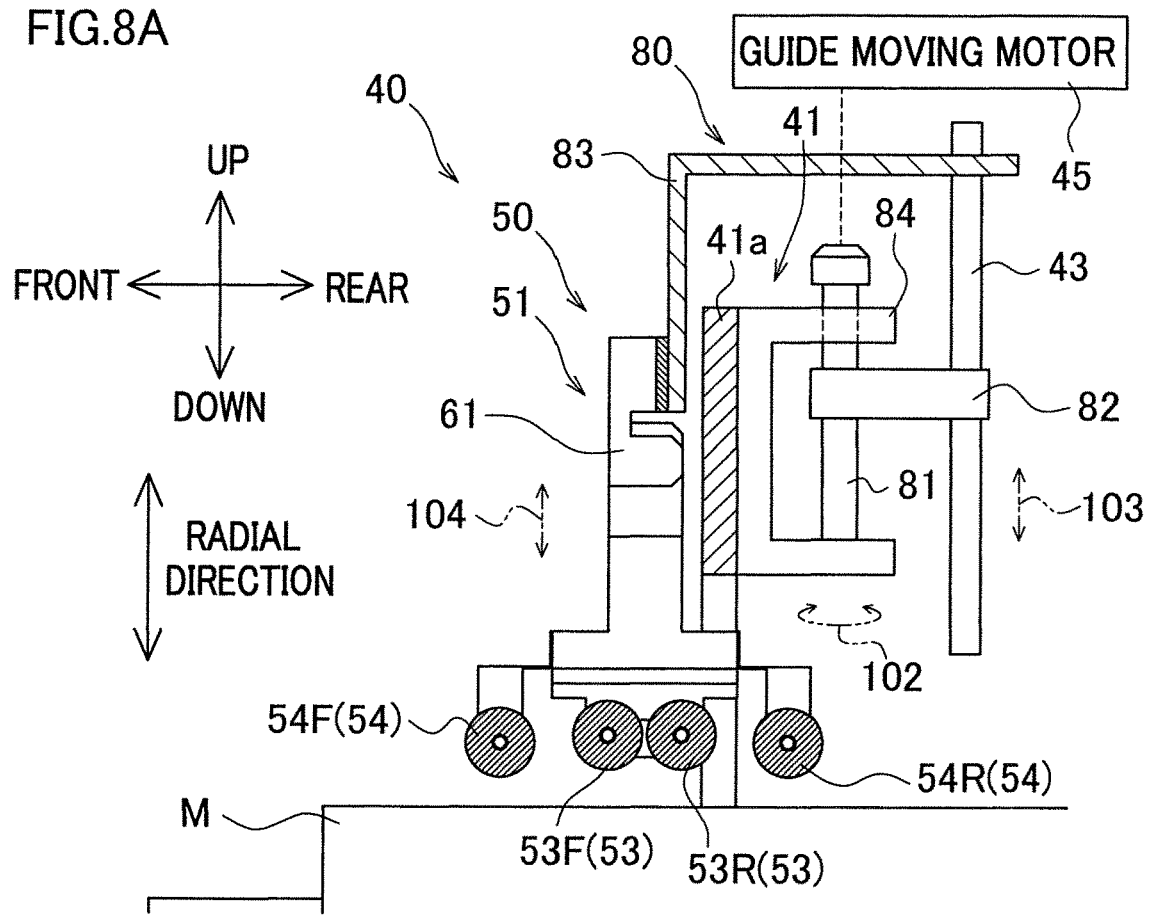
FIGS. 8A and 8B show a guide movement mechanism.
Figure 8B:
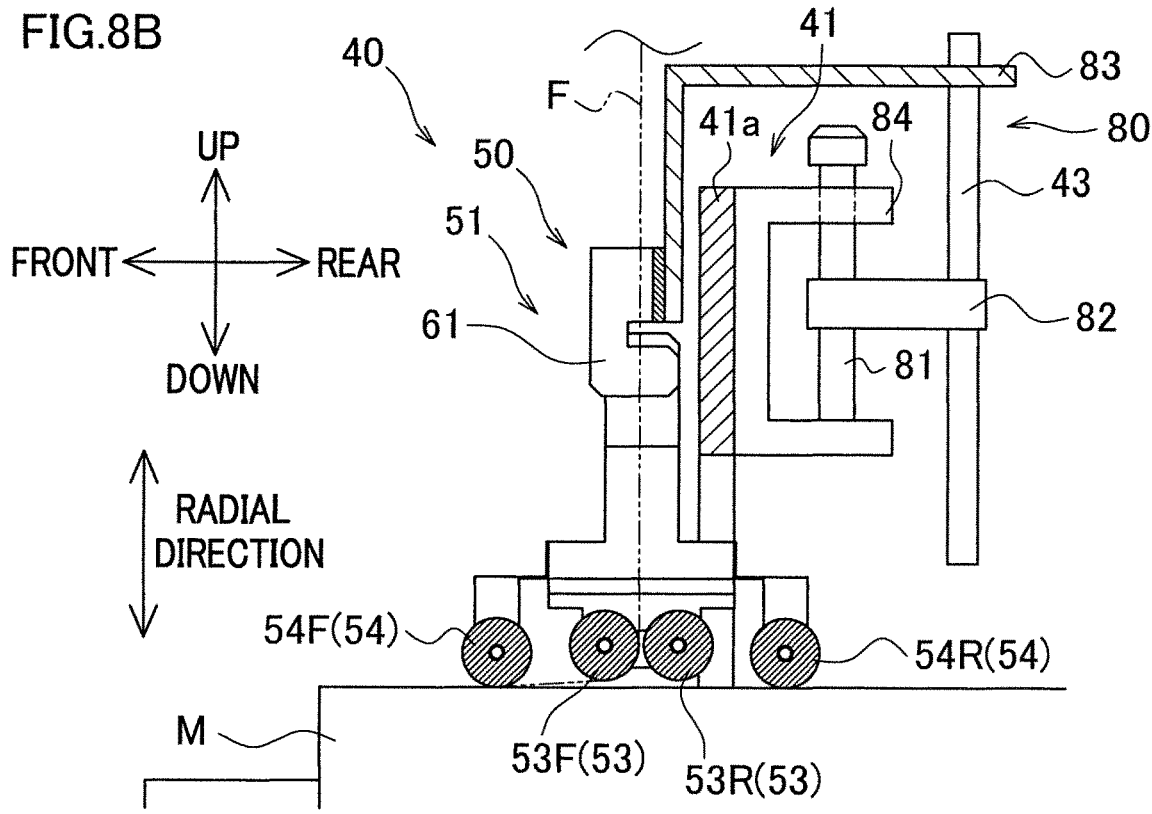

A structure that facilitates formation of the 0-degree oriented layer will be described with reference to FIGS. 4 to 8B. FIG. 4 is a front view of an upper part of a helical winding unit 40. FIG. 5 is a perspective view of a later-described fiber bundle guide unit 50. FIGS. 6A to 6C are a front view, plan view, and side view of the fiber bundle guide unit 50. FIG. 7 is a cross section of a pressing roller 54. The cross section includes an axis C. FIG. 8A is a cross section taken along a line VIII-VIII in FIG. 4. FIG. 8B shows a state in which the pressing roller 54 described below is in contact with the mandrel M.

As shown in FIG. 4, on the front surface of the helical winding unit 40, plural fiber bundle guide units 50 (twelve units in this example) are provided to correspond to the nozzles 43 that are radially disposed. The fiber bundle guide units 50 guide the fiber bundles F to the mandrel M which is moving in the front-rear direction without rotating, and stick the fiber bundles F onto the mandrel M. The fiber bundle guide units 50 are detachable from the helical winding unit 40, and attached to the helical winding unit 40 when a 0-degree oriented layer is formed on the mandrel M. The fiber bundle guide units 50 are placed radially in the circumferential direction of the passing hole 44 (i.e., the circumferential direction of the mandrel M). The fiber bundle guide units 50 are fixed to the nozzles 43 through connecting members 83 as shown in FIGS. 8A and 8B and described below, respectively. Because of this, the fiber bundle guide units 50 are movable in the radial direction of the mandrel M.

Fiber Bundle Guide Unit

The structure of the fiber bundle guide unit 50 will be described with reference to FIGS. 5 to 7. The fiber bundle guide unit 50 in FIGS. 5 and 6A to 6C is a fiber bundle guide unit 50 placed at a position of twelve o'clock in FIG. 4. The up-down direction in FIGS. 5 and 6A to 6C is equivalent to the radial direction of the mandrel M. The left-right direction in FIGS. 5 and 6A to 6C is equivalent to an axial direction of a pressing roller 54 described below (hereinafter, this axial direction of the pressing roller 54 will be referred to as a roller axial direction).

As shown in FIGS. 5 and 6A to 6C, the fiber bundle guide unit 50 includes a guide supporter 51, a pressing roller supporter 52, a widening roller 53, and the pressing roller 54. The fiber bundle guide unit 50 guides the fiber bundle F to the inner side from the outer side in the radial direction of the mandrel M (to the lower side from the upper side in FIGS. 5 and 6A to 6C) by the guide supporter 51, and widens the fiber bundle F by the widening roller 53. Furthermore, the fiber bundle guide unit 50 presses the fiber bundle F on the mandrel M by the pressing roller 54 supported by the pressing roller supporter 52. The fiber bundle guide unit 50 includes two pressing roller supporters 52, two widening rollers 53, and two pressing rollers 54. The two pressing roller supporters 52, the two widening rollers 53, and the two pressing roller 54 are symmetrical in the front-rear direction. Hereinafter, if required, reference symbols of front members such as the front pressing roller supporter 52 end with "F," whereas reference symbols of rear members such as the rear pressing roller supporter 52 end with "R."

To begin, the guide supporter 51 will be described. The guide supporter 51 guides the fiber bundle F to the inner side from the outer side in the radial direction of the mandrel M (i.e., to the downstream from the upstream in a fiber bundle running direction). The guide supporter 51 includes an upper member 61, intermediate members 62 and 63, and lower members 64 and 65. In the guide supporter 51, the upper member 61, the intermediate members 62 and 63, and the lower members 64 and 65 are placed in this order from the outer side to the inner side in the radial direction of the mandrel M. The guide supporter 51 has a shape which extends in the radial direction of the mandrel M on the whole.

The upper member 61 is connected to the helical winding unit 40 to be movable (details will be given later), and the intermediate members 62 and 63 are connected to end portions of the upper member 61 in the roller axial direction. The upper member 61 extends in the left-right direction (roller axial direction), and is roughly U-shaped when viewed from above as shown in FIGS. 5 and 6B. The intermediate members 62 and 63 are members which have shapes as shown in FIGS. 5, 6A and 6C extending in the up-down direction (radial direction of the mandrel M). An upper portion of the intermediate member 62 is fixed to a left end portion of the upper member 61, and an upper portion of the intermediate member 63 is fixed to a right end portion of the upper member 61, respectively. Intermediate portions of the intermediate members 62 and 63 in the up-down direction are bent in the left-right direction as shown in FIGS. 5 and 6A. Because of this, the intermediate members 62 and 63 function as plate springs and, for example, suppress small vibrations and the like of the fiber bundle guide unit 50 when the fiber bundle F is being stuck.

The lower members 64 and 65 support the two widening rollers 53 to be rotatable. The lower members 64 and 65 extend in the front-rear direction and each of these members has a substantially U-shape when viewed from above as shown in FIG. 6B. The lower member 64 is fixed to a lower portion of the intermediate member 62, and the lower member 65 is fixed to a lower portion of the intermediate member 63, respectively. The lower members 64 and 65 support both ends of the two widening rollers 53 aligned in the front-rear direction to be rotatable as shown in FIGS. 5 and 6C. To the lower member 64, a guide rod 66 (hatched part in FIG. 6B) extending in the front-rear direction is attached. Similarly, to the lower member 65, a guide rod 67 is attached. The guide rods 66 and 67 are aligned in the roller axial direction, and the fiber bundle F is introduced between the guide rods 66 and 67. Because of this, the fiber bundle F guided by the guide supporter 51 is suppressed from deviating in the roller axial direction.

The widening roller 53 will be described. The two widening rollers 53 (tension receiving members) widen the fiber bundle F guided to the inner side from the outer side in the radial direction of the mandrel M, and receive the tension of the fiber bundle F. The two widening rollers 53 are, for example, cylindrical rollers made of resin. The two widening rollers 53 are supported at both sides to be rotatable by the lower members 64 and 65, and passively rotate when the running fiber bundle F contacts the two widening rollers 53. The axial direction of the widening roller 53 is orthogonal to the axial direction of the mandrel M. The widening roller 53F is supported by front parts of the lower members 64 and 65, and the widening roller 53R is supported by rear parts of the lower members 64 and 65, respectively as shown in FIGS. 5 and 6C.

The widening rollers 53F and 53R are apart from each other in the front-rear direction, and the fiber bundle F is introduced between the widening rollers 53F and 53R. The widening roller 53F is placed to contact the fiber bundle F when the mandrel M moves forward. The widening roller 53R is placed to contact the fiber bundle F when the mandrel M moves rearward. The two widening rollers 53 are placed above (outer side in the radial direction of the mandrel M) the two pressing rollers 54 (as shown in FIGS. 6A to 6C), and configured not to contact the mandrel M.

The pressing roller supporter 52 will be described. As shown in FIGS. 5 and 6A to 6C, the two pressing roller supporters 52 are attached to front and rear end portions of the guide supporter 51 one by one. To be more specific, the two pressing roller supporters 52 are attached to front and rear end portions of the lower members 64 and 65.

The two pressing roller supporters 52 include plate spring members 71 and 72 (cushioning members), respectively. The plate spring members 71 and 72 are roughly L-shaped members when viewed in the front-rear direction. The plate spring member 71F provided at the front pressing roller supporter 52F is attached to a front end portion of the lower member 64 and extends forward. A front part of the plate spring member 71F extends downward (inward in the radial direction of the mandrel M), and supports one end portion of a rotational shaft of the pressing roller 54F. Similarly, the plate spring member 72F is attached to a front end portion of the lower member 65, and supports the other end portion of the rotational shaft of the pressing roller 54F. In other words, by the plate spring members 71F and 72F, the pressing roller 54F is supported at both sides to be rotatable. Even when pressing force of the pressing roller 54F is changed by some factors such as a small roughness on the circumferential surface of the mandrel M, the variation of the pressing force is absorbed by the plate spring members 71F and 72F.

Likewise, the rear pressing roller supporter 52R includes plate spring members 71R and 72R. The plate spring members 71R and 72R support both sides of the pressing roller 54R to be rotatable, and absorb variation of the pressing force of the pressing roller 54R on the mandrel M.

The two pressing rollers 54 will be described with reference to FIGS. 5 to 7. The two pressing rollers 54 stick the fiber bundle F onto the mandrel M along the front-rear direction (axial direction of the mandrel M) by pressing the fiber bundle F onto the mandrel M. Circumferential surfaces of the two pressing rollers 54 are made of a material having flexibility and/or elasticity such as, e.g., rubber or urethane. Axial directions of the two pressing rollers 54 are orthogonal to the axial direction of the mandrel M as shown in FIG. 4. As shown in FIGS. 5 and 6A to 6C, the front pressing roller 54F (first pressing roller) is supported at both sides to be rotatable by the pressing roller supporter 52F, and the rear pressing roller 54R (second pressing roller) is supported at both sides to be rotatable by the pressing roller supporter 52R, respectively. The two pressing rollers 54F and 54R are passively rotated when the running filament F contacts the two pressing rollers 54F and 54R. The pressing roller 54F is placed to press the fiber bundle F on the mandrel M when the mandrel M moves forward (one side). The pressing roller 54R is placed to press the fiber bundle F on the mandrel M when the mandrel M moves rearward (the other side).

The shape of the cross section including the axis C of the pressing roller 54 will be described with reference to FIG. 7. The pressing roller 54 includes a roller main body 55 and a rotational shaft 56. The roller main body 55 includes a reduced diameter part 55a, a roller end part 55b, and a roller end part 55c. In an axial direction (roller axial direction) of the rotational shaft 56 which is a rotational axis of the pressing roller 54, the reduced diameter part 55a is equivalent to a part between two chain double-dashed lines, and the roller end parts 55b and 55c are equivalent to parts formed at both outer sides of the reduced diameter part 55a in the roller axial direction.

The reduced diameter part 55a is curved so that the diameter decreases toward the center in the roller axial direction. In other words, the reduced diameter part 55a has a shape easily accompanying for the circumferential surface of the mandrel M. A cross section of the roller end part 55b is rectangular. In other words, the roller end part 55b has a cylindrical shape. The roller end part 55c has a shape and size similar to those of the roller end part 55b.

An angle formed between an outer edge 55d of the reduced diameter part 55a in the cross section and an outer edge 55e of the roller end part 55b shown in FIG. 7 will be described. The angle between the outer edge 55d and the outer edge 55e, i.e., the angle θ between a tangent 101 to the end (point 100) of the outer edge 55d in the roller axial direction and the outer edge 55e is larger than 90° (i.e., an obtuse angle). An angle between the outer edge 55d and the outer edge of the roller end portion 55c is similarly arranged. As shown in FIG. 7, the roller end part 55b is placed more on the inner side than the tangent 101 in a radial direction of the pressing roller 54. The roller end part 55c is similarly arranged.

Guide Movement Mechanism

The guide movement mechanism 80 moving the fiber bundle guide unit 50 structured as described above in the radial direction of the mandrel M will be described with reference to FIGS. 8A and 8B. FIG. 8A is a cross section taken along a line VIII-VIII in FIG. 4. FIG. 8B shows a state in which the fiber bundle guide unit 50 has moved to the inner side in the radial direction of the mandrel M from the state shown in FIG. 8A.

As shown in FIGS. 8A and 8B, the guide movement mechanism 80 is attached to the main body 41 of the helical winding unit 40. The guide movement mechanism 80 includes, for example, a spiral shaft 81, a ball nut 82, a connecting member 83, the nozzle 43, and the guide moving motor 45. In the guide movement mechanism 80, the ball nut 82 and the nozzle 43 attached to the ball nut 82 move in the radial direction of the mandrel M by the rotation of the spiral shaft 81. In addition to that, the fiber bundle guide unit 50 is attached to the connecting member 83 attached to a tip portion of the nozzle 43, and the fiber bundle guide unit 50 moves together with the nozzle 43. The following describes details.

The spiral shaft 81 is supported to be rotatable by a supporting member 84 which is C-shaped and attached to a rear surface of a front end portion 41a of the main body 41. The spiral shaft 81 extends in the radial direction of the mandrel M. The spiral shaft 81 has a male screw thereon. The spiral shaft 81 is driven and rotated by the guide moving motor 45 (indicated by an arrow 102). At a front part of the ball nut 82, a female screw is formed. The ball nut 82 is screwed to the spiral shaft 81. To a rear part of the ball nut 82, the nozzle 43 is attached. The nozzle 43 is movable together with the ball nut 82 (indicated by an arrow 103). The L-shaped connecting member 83 is attached to an outer side end portion of the nozzle 43 in the radial direction of the mandrel M. The connecting member 83 extends forward from a part connected to the nozzle 43, and a front end portion of the connecting member 83 extends inward in the radial direction of the mandrel M. The guide supporter 51 of the fiber bundle guide unit 50 is attached to the connecting member 83. To be more specific, the upper member 61 of the guide supporter 51 is fixed to an inner side end portion in the radial direction of the front end portion of the connecting member 83. By the guide movement mechanism 80 having the structure described above, the fiber bundle guide unit 50 is movable in the radial direction of the mandrel M (indicated by an arrow 104). The guide movement mechanism 80 adjusts a position of the fiber bundle guide unit 50 so that the pressing roller 54 contacts the circumferential surface of the mandrel M as shown in FIG. 8B.

Supply Passage of Fiber Bundle

A supply passage of the fiber bundle F to the mandrel M will be described. When the 0-degree oriented layer is formed, after the fiber bundle F is guided by the guide 42, as shown in FIG. 4, of the helical winding unit 40, the fiber bundle F is guided to the inner side from the outer side in the radial direction of the mandrel M by the guide supporter 51 of the fiber bundle guide unit 50 as shown in FIG. 8B, without passing through the nozzle 43. Subsequently, the fiber bundle F is widened and guided due to contact with the widening roller 53 (the widening roller 53F in FIG. 8B), and pressed on the mandrel M by the pressing roller 54 (the pressing roller 54F in FIG. 8B). In this way, the fiber bundle F is supplied to the mandrel M by the helical winding unit 40 via the fiber bundle guide unit 50.

Sticking

Figure 9:
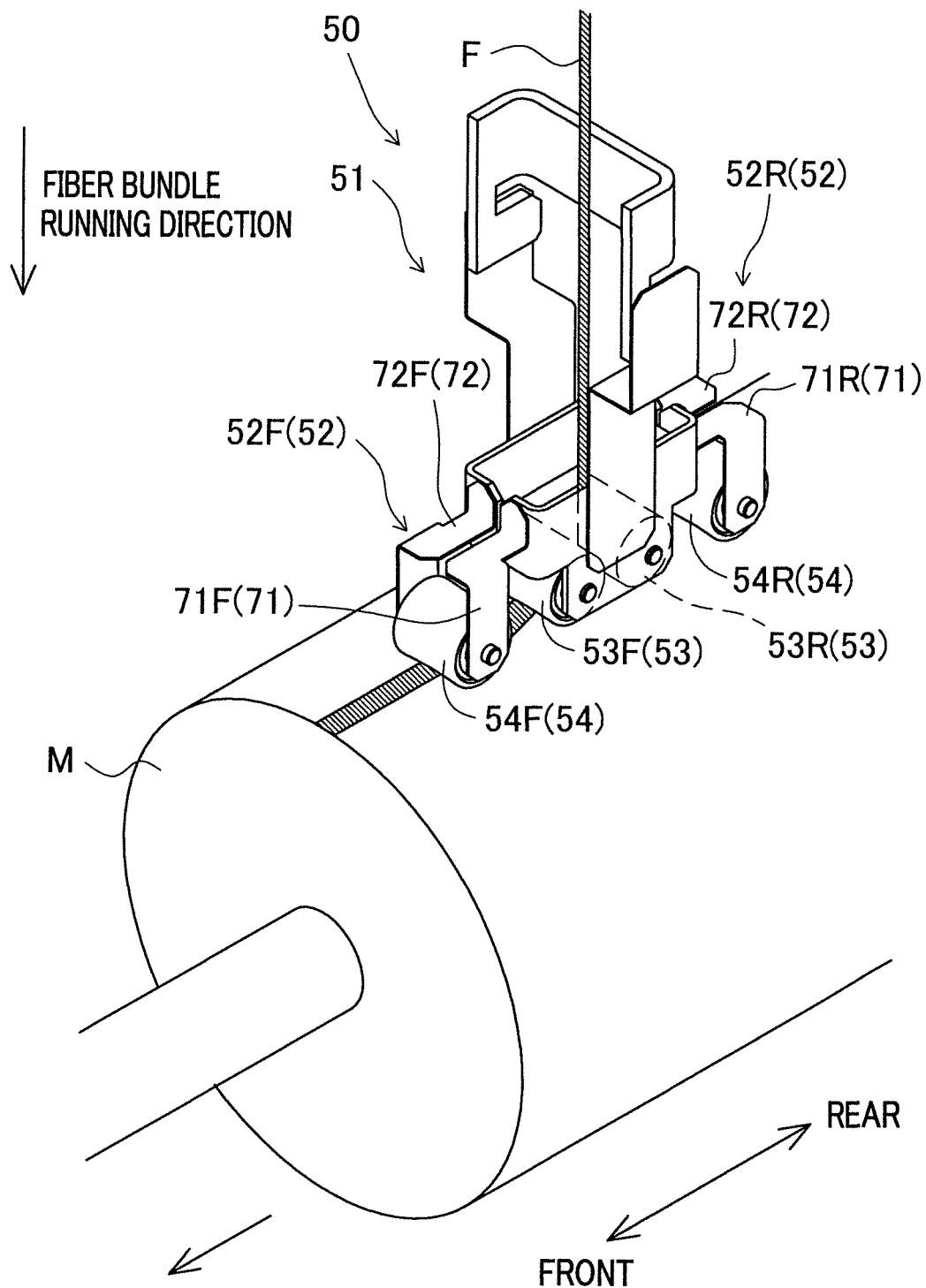
FIG. 9 shows a mandrel which is supplied with a fiber bundle.
Figure 10A:
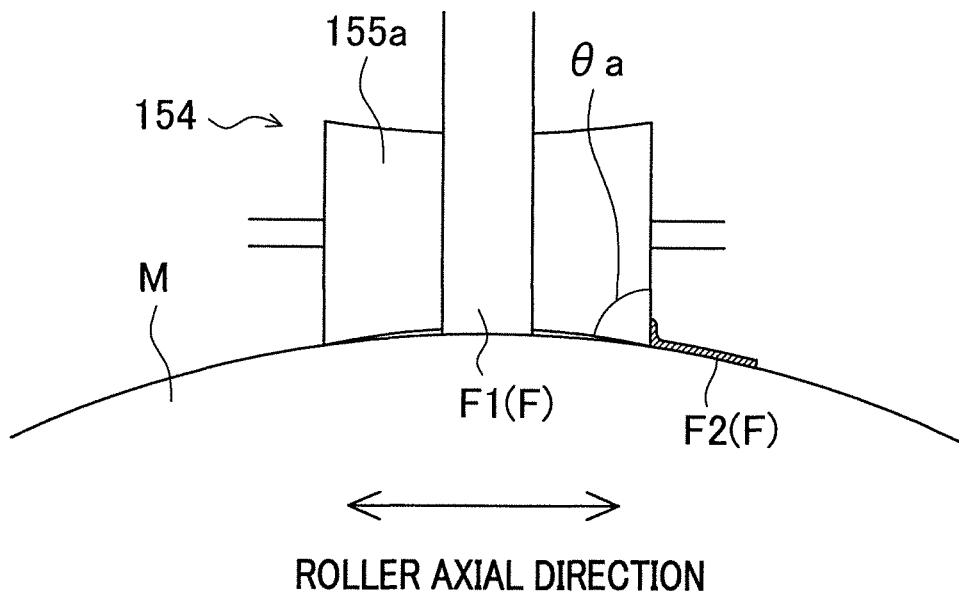
FIGS. 10A and 10B show a contact state of the pressing roller and the mandrel.
Figure 10B:
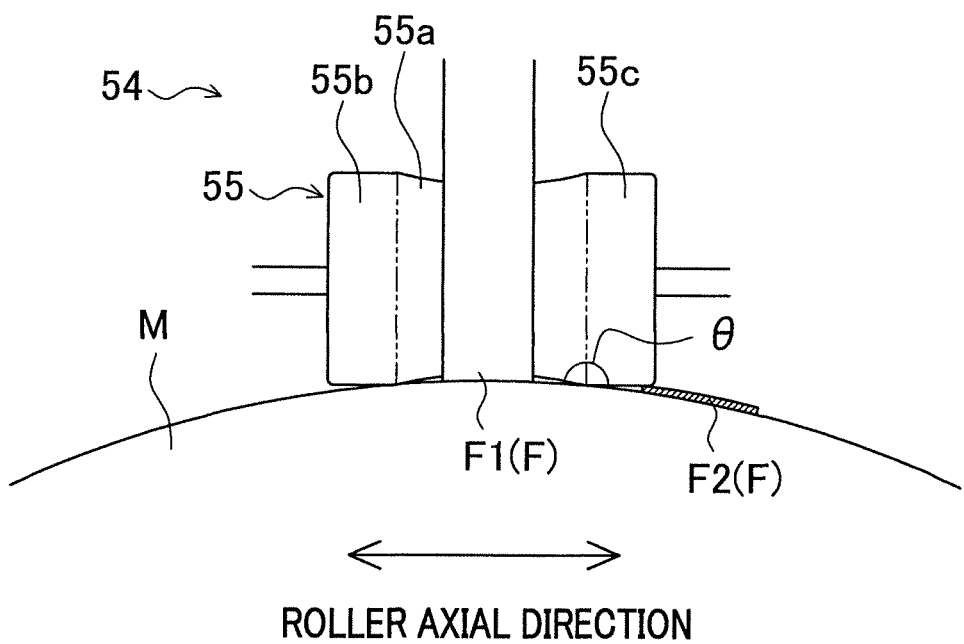

The following will describe an operation when the 0-degree oriented layer is formed (i.e., sticking that sticks the fiber bundle F onto the mandrel M in the front-rear direction) in the filament winding device 1 having the structure described above, with reference to FIGS. 9, 10A and 10B. FIG. 9 shows a state in which the fiber bundle F is supplied to the mandrel M and stuck onto the mandrel M. FIG. 10A shows a contact state of the pressing roller and the mandrel M when the pressing roller of the fiber bundle guide unit 50 has a different shape from the pressing roller 54 of this example. FIG. 10B shows a contact state of the pressing roller 54 and the mandrel M. In this regard, among the fiber bundle guide units 50, the fiber bundle F which is supplied through the fiber bundle guide unit 50 placed at the twelve o'clock position in FIG. 4 will be described. However, the other fiber bundles F are similarly arranged.

To start sticking, to begin with, an operator guides the fiber bundle F to the mandrel M from the bobbin B through the fiber bundle guide unit 50, and then fixes the tip portion of the fiber bundle F to the end portion (for example, the front end portion as shown in FIG. 9) of the mandrel M by, e.g., a tape. Subsequently, the controller 5 (see FIG. 3; controller) controls the guide moving motor 45 as shown in FIG. 3 and activates the guide movement mechanism 80 as shown in FIG. 8. In addition, the controller 5 moves the fiber bundle guide unit 50 inward in the radial direction of the mandrel M, and causes the pressing roller 54 to contact the mandrel M. With this, the pressing roller 54 is pressed on the circumferential surface of the mandrel M, and a part of the fiber bundle F sandwiched between the pressing roller 54 and the mandrel M is pressed on the mandrel M.

Subsequently, the controller 5 controls the moving motor 24 as shown in FIG. 3 and moves the supporting units 20 forward to move the mandrel M forward relative to the helical winding unit 40 as shown in FIG. 9. With this, the fiber bundle F runs with being pulled out from the bobbin B, and after being widened by the widening roller 53F, the fiber bundle F is pressed on the mandrel M by the pressing roller 54F to be stuck onto the mandrel M by the viscosity of the resin. Therefore, the fiber bundle F is likely to be stuck onto the mandrel M before sagging under its own weight. In this regard, when sticking is performed in this examples, the controller 5 does not drive the rotating motor 25 as shown in FIG. 3. In other words, when sticking is performed, the mandrel M does not rotate.

In this stage, even when the mandrel M does not rotate, some tension is applied to the fiber bundle F on account of the movement of the mandrel M in the axial direction. The tension functions as to lift the pressing roller 54F. However, because the tension is received by the widening roller 53F, the tension is suppressed from being directly applied to the pressing roller 54F placed downstream of the widening roller 53F in the fiber bundle running direction.

Furthermore, the controller 5 drives the moving motor 24 and moves the supporting units 20 forward so that the sticking of the fiber bundle reaches a rear end portion of the mandrel M. In this stage, sticking has been completed once. To the contrary, when the fiber bundle F is stuck from the rear end portion to the front end portion of the mandrel M, the fiber bundle F is guided by the widening roller 53R and the pressing roller 54R which are placed at a rear part of the fiber bundle guide unit 50.

For example, as shown in FIGS. 10A and 10B, when the fiber bundle F1 is stuck along the axial direction of the mandrel M, a fiber bundle F2 may already be stuck onto another position different from a position onto which the fiber bundle F1 is stuck, along the axial direction of the mandrel M. In this example, as shown in FIG. 10A, when the pressing roller is a pressing roller 154 which is entirely curved including both end portions (i.e., a reduced diameter part 155a is formed at the both end portions) in the axial direction, an angle $\theta a$ between an end face of the pressing roller 154 and an outer edge of the reduced diameter part 155a is an acute angle. Therefore, the fiber bundle F2 may be turned up by the pressing roller 154 when the mandrel M moves in the axial direction. In this regard, in the pressing roller 54 of this example, the angle $\theta$ between the outer edge 55e of the roller end part 55b and the outer edge 55d of the reduced diameter part 55a is an obtuse angle as shown in FIG. 7. The roller end part 55c is similarly arranged. In other words, as shown in FIG. 10B, the end portion of the reduced diameter part 55a and its surroundings have a more gradual shape compared to the configuration shown in FIG. 10A. Because of this, the fiber bundle F2 is less likely to be turned up even if the end portion of the reduced diameter part 55a in the roller axial direction makes a contact with the fiber bundle F2.

Formation of 0-Degree Oriented Layer

Figure 11:
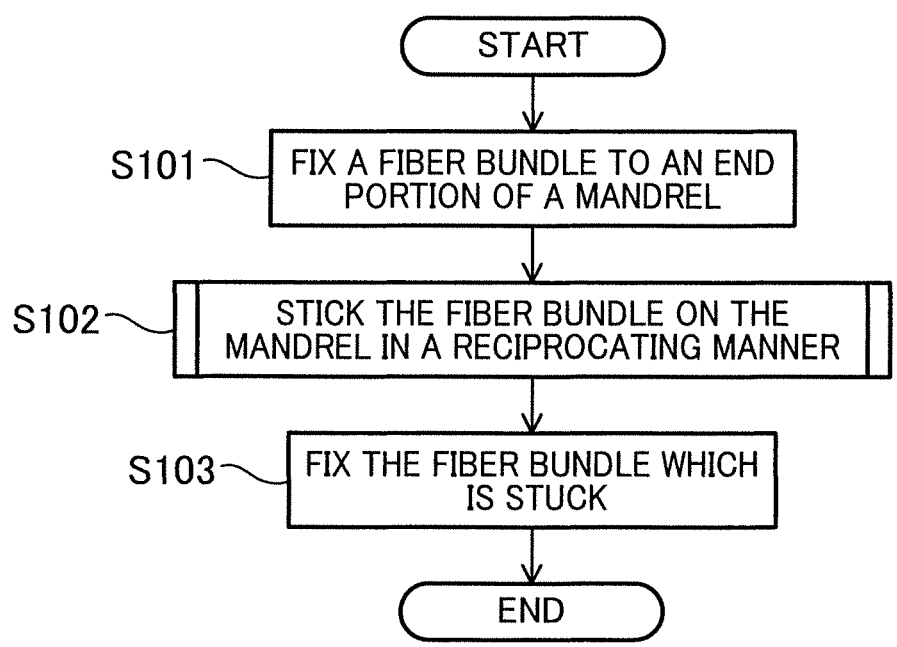
FIG. 11 is a flow chart showing an process of sticking the fiber bundle onto the mandrel.
Figure 12:
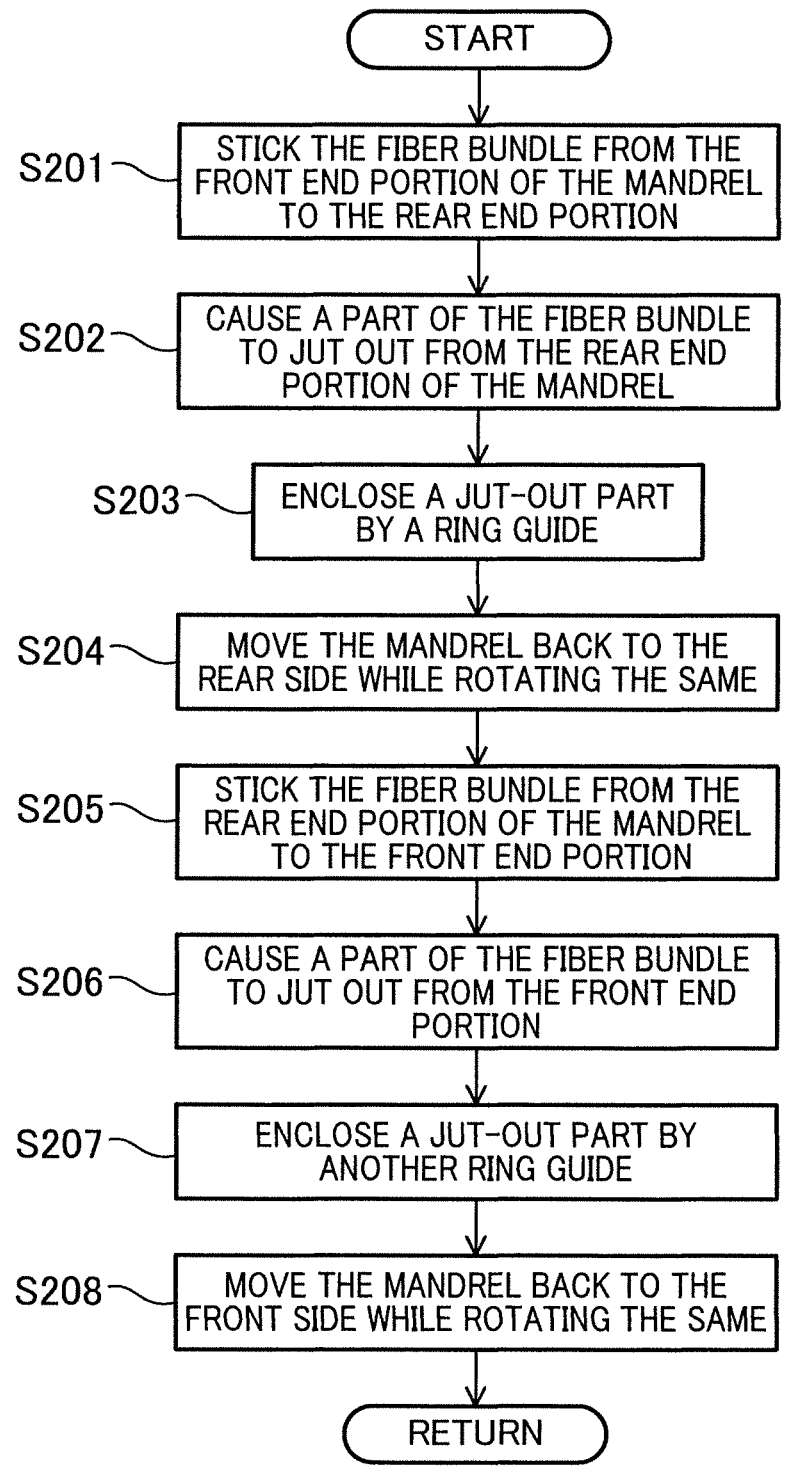
FIG. 12 is a flow chart showing a detailed process of sticking of the fiber bundle in a reciprocating manner.

The following will describe a specific process of forming the 0-degree oriented layer on the whole circumference of the mandrel M along the axial direction of the mandrel M with reference to FIGS. 11 to 16C. FIG. 11 is a flow chart showing a process of forming the 0-degree oriented layer by sticking the fiber bundles F onto the mandrel M. FIG. 12 is a flow chart showing a specific process of sticking the fiber bundles F in a reciprocating manner (sequence S102 described below). The other figures will be described according to need.

In this example, the fiber bundles F are stuck onto the whole circumference of the mandrel M by twelve fiber bundle guide units 50, with the result that each fiber bundle F supplied by one bobbin B is stuck onto one-twelfth of the circumference of the mandrel M. Therefore, depending on the outer diameter of the mandrel M, after the sticking has been completed once as described above, the mandrel M needs to be rotated and moved in the circumferential direction by the width of the fiber bundle F to repeat sticking the fiber bundle F onto a part onto which the fiber bundle F is not stuck yet. For production efficiency, preferably, the fiber bundle F stuck to reach the end of the mandrel M is returned in the axial direction without being cut so that the fiber bundle F is continuously stuck onto the mandrel. However, when the fiber bundle F is stuck to reach a rear end portion of the mandrel M and then the fiber bundle F is returned by moving the mandrel M rearward, the fiber bundle F stuck onto the end portion of the mandrel M may be pulled in the axial direction and peeled off by the tension applied to the fiber bundle F. Therefore, in this example, the 0-degree oriented layer is formed by the way described below.

A procedure of forming the 0-degree oriented layer will be schematically described. To begin with, as described above, the tip portion of the fiber bundle F is fixed on the end portion of the mandrel M (S101). Subsequently, the sticking, rotating of the mandrel M, and returning (details described below) in which the fiber bundle F is returned to the other side from one side in the axial direction of the mandrel M are repeated so that the fiber bundle F is stuck onto the mandrel M in the reciprocating manner (S102). Finally, the both end portions, in the axial direction of the mandrel M, of the fiber bundle F stuck onto the whole circumference of the mandrel M are fixed by, e.g., performing the hoop-winding by the hoop winding unit 30 (S103).

Process of Sticking the Fiber Bundle in Reciprocating Manner

The following will describe the details of the process of sticking the fiber bundle F onto the mandrel M in the reciprocating manner (S102).

Figure 13A:
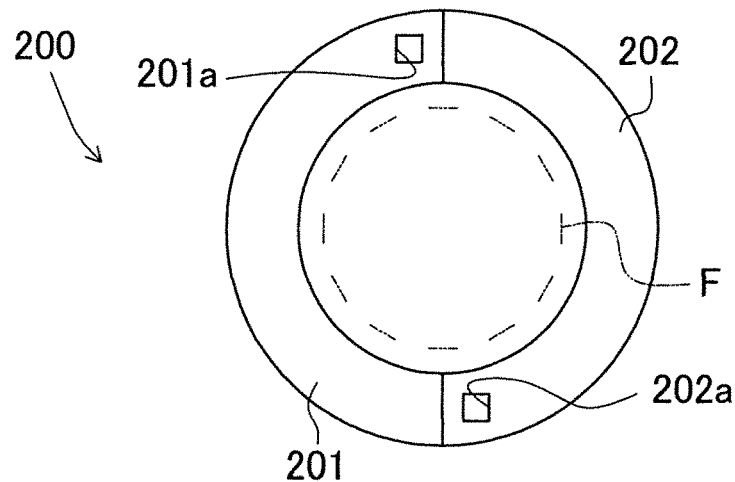
FIGS. 13A to 13C show a ring guide.
Figure 13B:
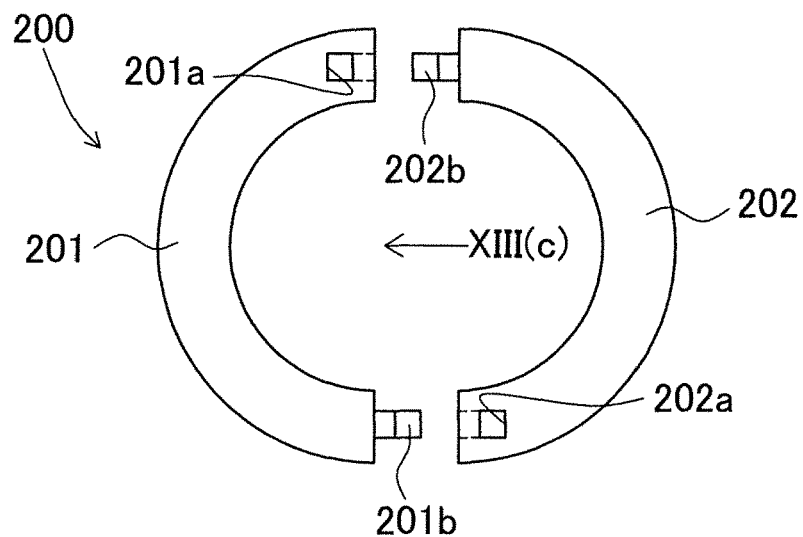
Figure 13C:
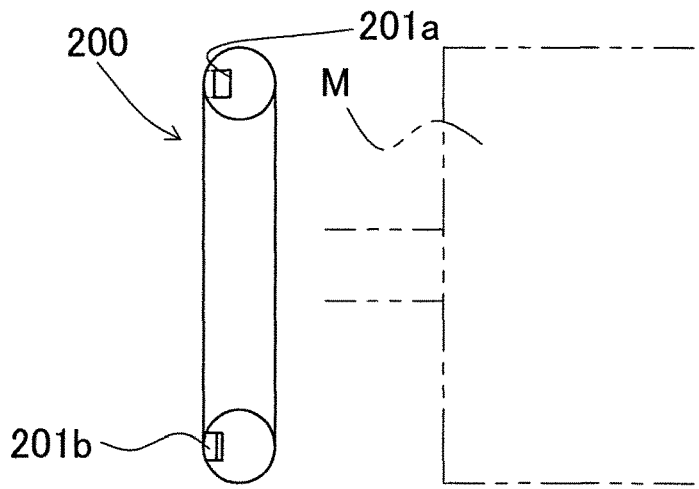

Before the description of the detailed process, a structure of a ring guide 200 (returning guide tool) used to cause the fiber bundle F to be returned in the axial direction will be described with reference to FIGS. 13A to 13C. FIG. 13A is a whole figure of the ring guide 200. FIG. 13B is an exploded view of the ring guide 200. FIG. 13C shows that FIG. 13B is viewed from the direction indicated by the arrow XIII(c).

The ring guide 200 is a tool that encloses the fiber bundles F as shown in FIGS. 13A to 13C to return the fiber bundles F in the axial direction. The ring guide 200 has, as shown in FIG. 13A, a ring shape that is circular in cross section. The outer diameter of the ring guide 200 is substantially identical to the outer diameter of the mandrel M as shown in FIG. 13C. As shown in FIG. 13B, the ring guide 200 can be separated into two guide pieces 201 and 202 each of which is half-ring shaped. The guide pieces 201 and 202 are, for example, connected by the way described below. As shown in FIGS. 13B and 13C, an engagement hole 201a is formed at one end portion of the guide piece 201, and an engagement pawl 201b is formed at the other end portion of the guide piece 201. An engagement hole 202a is formed at an end portion of the guide piece 202 facing to the engagement pawl 201b, and an engagement pawl 202b is formed at an end portion of the guide piece 202 facing to the engagement hole 201a as shown in FIG. 13B. The engagement hole 201a and the engagement pawl 202b are engaged with each other and the engagement hole 202a and the engagement pawl 201b are engaged with each other so that the guide piece 201 and the guide piece 202 are connected to each other.

Figure 14A:
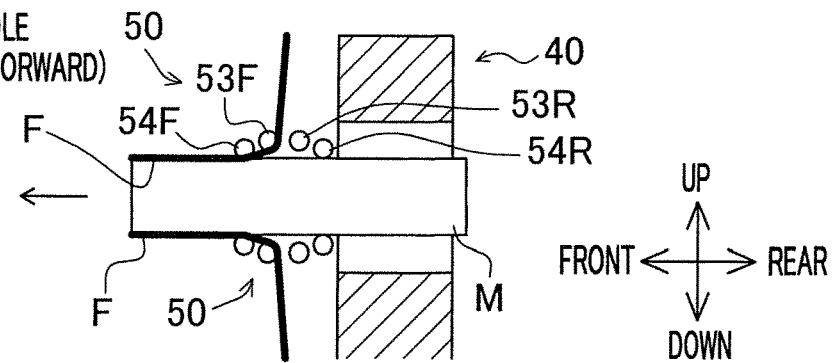
FIGS. 14A to 14D show a return of the fiber bundles with the ring guide.
Figure 14B:
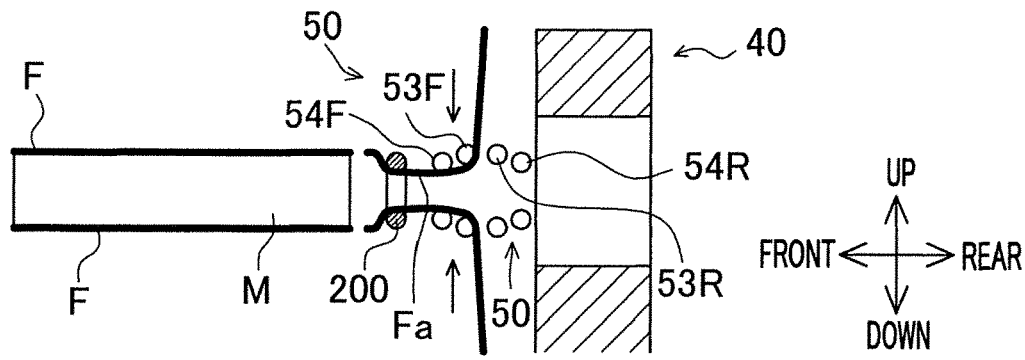
Figure 14C:
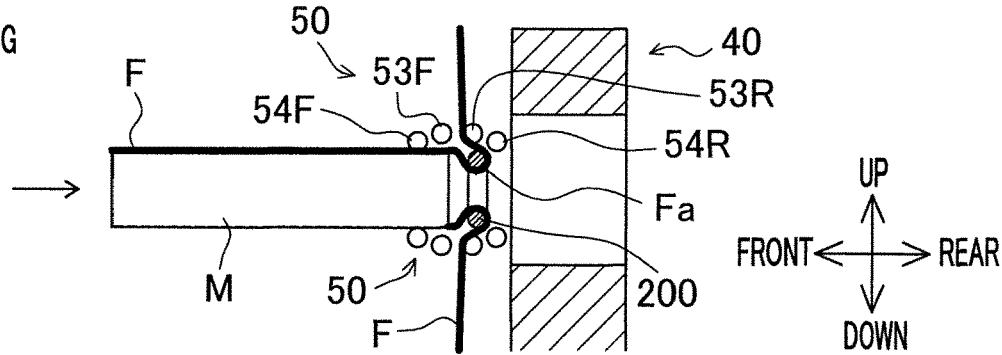
Figure 14D:
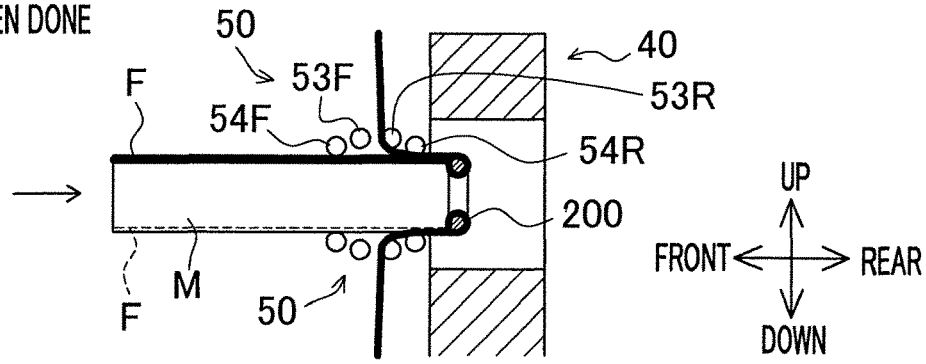
Figure 15A:
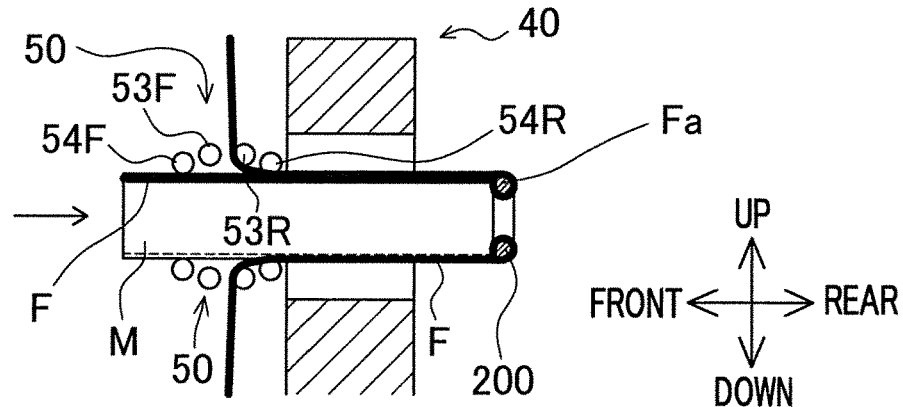
FIGS. 15A to 15C show the return of the fiber bundles with the ring guide.
Figure 15B:
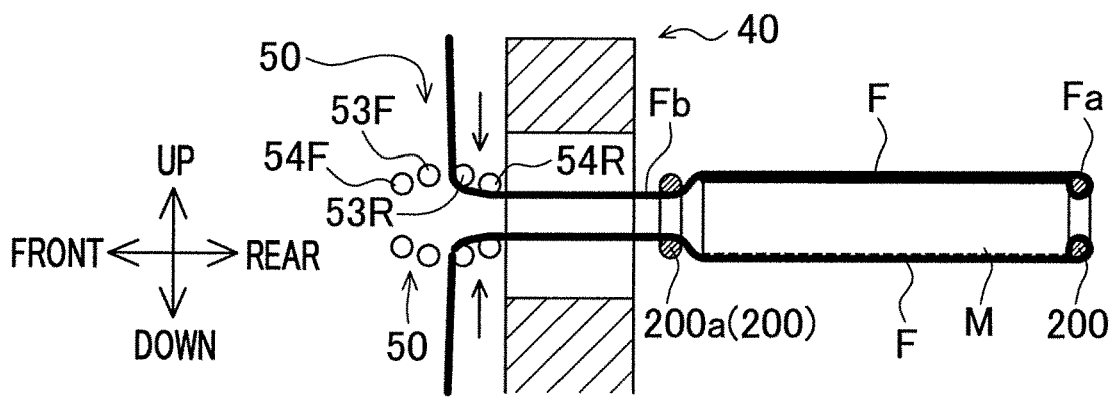
Figure 15C:
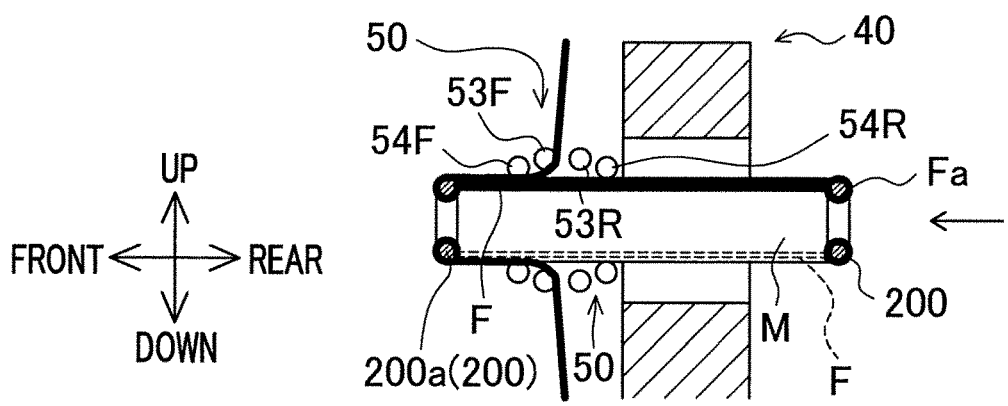
Figure 16A:
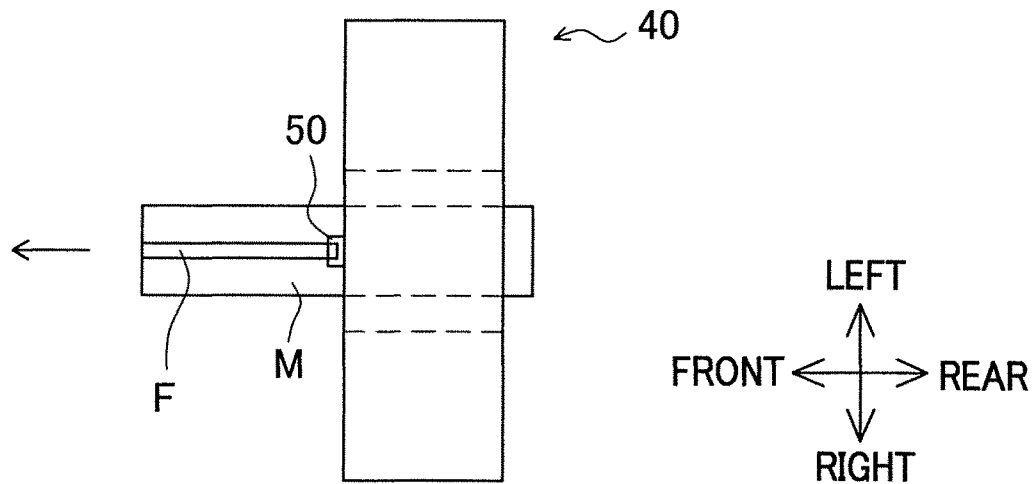
FIGS. 16A to 16C show the return of the fiber bundle with the ring guide.
Figure 16B:
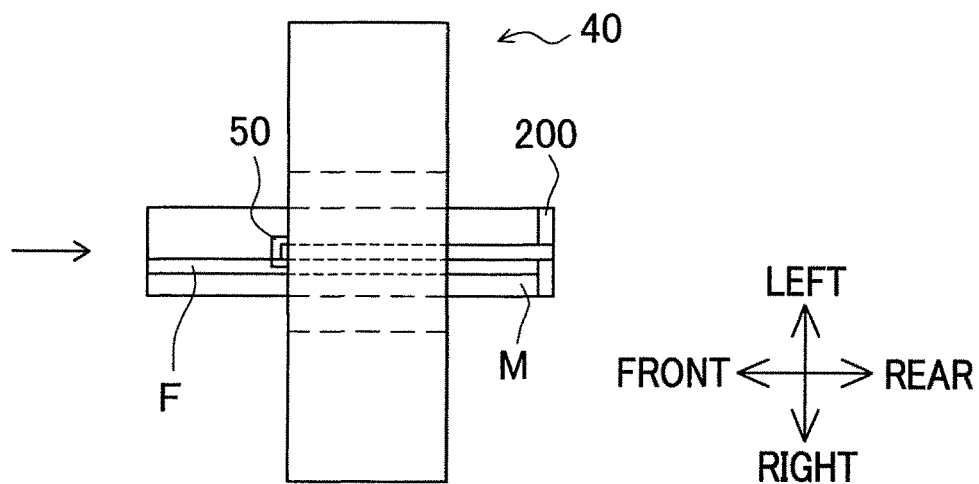
Figure 16C:
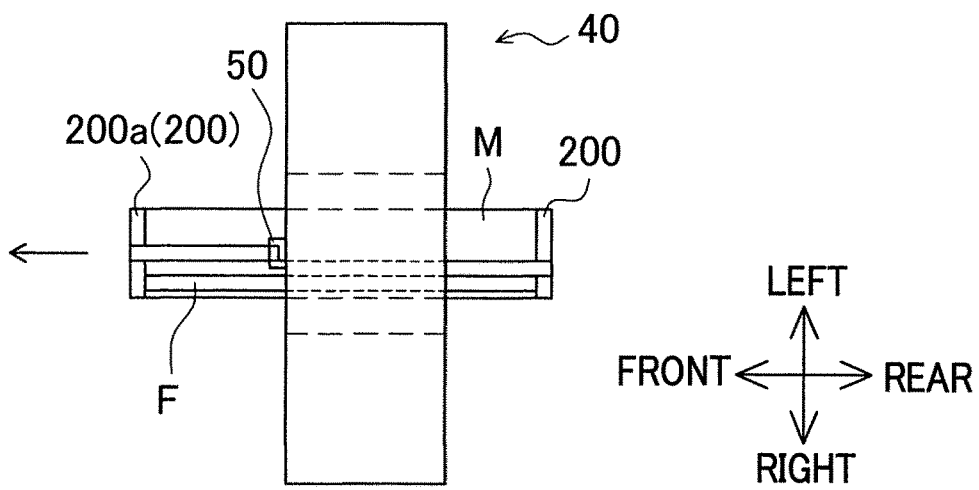

The following will describe a specific process of sticking the fiber bundle F onto the mandrel M in the reciprocating manner with reference to FIG. 14A to FIG. 16C. FIGS. 14A to 14D and FIGS. 15A to 15C show the movements of the mandrel M and the fiber bundles F when the helical winding unit 40 and the mandrel M are viewed from the side. FIGS. 16A to 16C show the helical winding unit 40 and the mandrel M from above. FIGS. 14A to 14D and FIGS. 15A to 15C show the fiber bundle guide units 50 and the fiber bundles F at the twelve o'clock position and six o'clock position in FIG. 4. FIGS. 16A to 16C shows the fiber bundle guide unit 50 and the fiber bundle F at the twelve o'clock position in FIG. 4. The supporting units 20 as shown in, e.g., FIG. 2 are omitted from the figure.

To begin, the controller 5 controls the moving motor 24 as shown in FIG. 3 in the state in which the tip portions of the fiber bundles F are fixed to the front end portion of the mandrel M, and moves the supporting units 20 and the mandrel M forward from the rear side as shown in FIGS. 14A and 16A. Because of this, the fiber bundles F are stuck from the front end portion to the rear end portion of the mandrel M (S201).

Subsequently, the controller 5 moves the supporting units 20 further forward. Because of this, each fiber bundle supplied to the mandrel juts out as shown in FIG. 14B from the front end portion of the mandrel M (S202). In this state, the controller 5 controls the guide moving motor 45 as shown in FIG. 8 and activates the guide movement mechanism 80 as shown in FIG. 8, and moves the fiber bundle guide units 50 inward in the radial direction of the mandrel M (indicated by an arrow in FIG. 14B). Because of this, jut-out parts Fa of the fiber bundles F jutting out from the front end portion of the mandrel M are pulled inward in the radial direction of the mandrel M. In this state, an operator encloses the jut-out parts Fa with the ring guide 200 as shown in FIG. 14B described above (S203).

When the jut-out parts Fa are enclosed with the ring guide 200, the controller 5 moves the fiber bundle guide units 50 outward in the radial direction of the mandrel M, and puts the fiber bundle guide units 50 back to the positions at the time of the sticking. After that, while controlling the rotating motor 25 as shown in FIG. 3 so that the mandrel M is rotated and moved in the circumferential direction by the width of the fiber bundle F, the controller 5 controls the moving motor 24 as shown in FIG. 3 so that the supporting units 20 and the mandrel M are moved back to the rear side (S204). In this example, a direction in which the mandrel M rotates is clockwise when viewed from the front.

In this way, the returning is performed to return the fiber bundles F back to the rear side while the fiber bundles F are guided from the inner side to the outer side in the radial direction of the ring guide 200 as shown in FIG. 14C. Because the ring guide 200 is circular in cross section, the fiber bundles F are smoothly returned along the ring guide 200. Therefore, when the fiber bundles F are easily broken such as pitch carbon fiber bundles and so on, the fiber bundles F are suppressed from being broken. In this stage, rotation and movement (returning) of the mandrel M may not be performed at the same time. One of these may be performed first, and the other may be performed later. In this example, because the rotational direction of the mandrel M in the returning is clockwise when viewed from the front, the lower fiber bundle F out of the fiber bundles F stuck on the mandrel M is hidden on the far side of the paper in FIG. 14C (same in the following figures).

The controller 5 moves the supporting units 20 further rearward, with the result that the ring guide 200 is pulled forward (toward the mandrel M) by the tension of the fiber bundles F as shown in FIG. 14D. Because the pulled ring guide 200 is received by an end face of the mandrel M by contact therewith, the fiber bundles F are received by the ring guide 200 even when the fiber bundles F are pulled forward. Therefore, the fiber bundles F are suppressed from being peeled off from the mandrel M.

Subsequently, the controller 5 moves the supporting units 20 rearward as shown in FIGS. 15A and 16B, and the fiber bundles F are stuck from the rear end portion to the front end portion of the mandrel M (S205). In this stage, the operator does not remove the ring guide 200 yet. In other words, in this stage, the state in which the jut-out parts Fa are enclosed is maintained. Because the outer diameter of the ring guide 200 is substantially identical to the outer diameter of the mandrel M, the ring guide 200 is suppressed from interfering with the pressing roller 54.

After that, the controller 5 moves the supporting units 20 further rearward to cause a part of each fiber bundle F to jut out as shown in FIG. 15B from the front end portion of the mandrel (S206), and moves the fiber bundle guide units 50 inward in the radial direction of the mandrel M (indicated by an arrow in FIG. 15B). Subsequently, the operator encloses as shown in FIG. 15B a front jut-out part Fb by another ring guide 200 (ring guide 200a) that is different from the ring guide 200 enclosing the jut-out parts Fa (S207). Furthermore, after moving the fiber bundle guide units 50 outward in the radial direction of the mandrel M, the controller 5 moves back the mandrel M forward while rotating the mandrel M in the circumferential direction by the width of the fiber bundle F (S208). Because of this, it becomes possible to stick the fiber bundles F from the front end portion to the rear end portion of the mandrel M again as shown in FIGS. 15C and 16C.

By repeating the above-described operations, the sticking of the fiber bundles F on the whole circumference of the mandrel M can be performed. In this regard, the operator does not remove the ring guide 200 until the 0-degree oriented layer is formed on the whole circumference of the mandrel M. The operator encloses jut-out parts of the fiber bundles F by another ring guide 200 at each returning. Therefore, the number of the ring guides 200 increases each time the returning is performed, and the ring guides 200 are aligned in the axial direction of the mandrel M. After the 0-degree oriented layer is formed on the whole circumference of the mandrel M, the both end portions of the fiber bundles F are fixed by, e.g., the hoop-winding as described above. Subsequently, by cutting the jut-out parts Fa and the like, the ring guides 200 become collectable.

As described above, as the fiber bundle F is pressed on the circumferential surface of the mandrel M by the pressing roller 54 of the fiber bundle guide unit 50, the fiber bundle F is stuck onto the mandrel because of the viscosity of resin. Because of this, even when the mandrel M does not rotate and the tension applied to the fiber bundle F is low, the fiber bundle F can be stuck on the mandrel M before the fiber bundle F supplied to the mandrel M sags. As a result, the fiber bundle F is easily stuck on a target position. Therefore, the fiber bundle F is easily stuck along the axial direction of the mandrel M.

The tension applied to the fiber bundle F is received by the widening roller 53 placed upstream of the pressing roller 54. Because of this, the tension is suppressed from being directly applied to the pressing roller 54 so that the pressing force of the pressing roller 54 is suppressed from becoming low.

Because the fiber bundle F runs smoothly along the widening roller 53, the fiber bundle F is suppressed from being broken.

The positions of the fiber bundle guide units 50 are adjusted depending on the outer diameter of the mandrel M so that the fiber bundles F are pressed on the circumferential surface of the mandrel M having various outer diameters by the pressing rollers 54.

The fiber bundle F is pressed on the circumferential surface of the mandrel M by the pressing roller 54F when the mandrel M moves forward, and pressed on the circumferential surface of the mandrel M by the pressing roller 54R when the mandrel M moves rearward. Because of this, the fiber bundle F is stuck on the mandrel M both when the mandrel M moves forward and when the mandrel M moves rearward. Therefore, the fiber bundle F is efficiently stuck on the mandrel M.

Because the pressing roller 54 has the reduced diameter part 55a, the reduced diameter part 55a is facilitated to be along the circumferential surface of the mandrel M, with the result that a contact area between the pressing roller 54 and the mandrel circumferential surface is increased. Therefore, the fiber bundle F is stably stuck on the circumferential surface of the mandrel M.

The angle formed between the outer edge 55e of the roller end part 55b and the outer edge 55d of the reduced diameter part 55a is an obtuse angle. In other words, the end portion and its surroundings of the reduced diameter part 55a have a more gradual shape compared to when the reduced diameter part 55a (part likely to contact the fiber bundle) is formed to reach the end in the roller axial direction. Because of this, even when the end portion of the reduced diameter part 55a in the roller axial direction contacts the fiber bundle F already stuck on the mandrel M, the fiber bundle F is less likely to be peeled off.

Because the roller end portion is rectangular in cross section (i.e., the roller end portion is cylindrical, and the diameter of the roller end portion is consistent), processing in manufacture is facilitated.

Even when the pressing force of the pressing roller 54 is changed by some reasons, the variation of the pressing force is absorbed by the plate spring members 71 and 72. Therefore, the following problems can be suppressed: the fiber bundle F is not stuck on the mandrel M successfully because the pressing force is decreased too much; and pressure to, e.g., the pressing roller 54 becomes excessive because the pressing force becomes excessive.

The plate spring members 71 and 72 support the pressing roller 54, and absorb the variation of the pressing force of the pressing roller 54. In other words, it is unnecessary to individually provide a member for supporting a pressing roller and a cushioning member. Therefore, increase in the number of components and cost growth are suppressed.

Because the pressing roller 54 is supported at both sides, the one end portion of the pressing roller 54 in the roller axial direction is suppressed from being displaced greatly as compared with the other end portion. As a result, the pressing roller 54 is suppressed from being tilted with respect to the circumferential surface of the mandrel M. Therefore, the fiber bundle F is stably stuck on the mandrel M.

By the controller 5, after the fiber bundle F is stuck on the mandrel M by the movement of the supporting units 20 to one side in the axial direction, the part of each fiber bundle F is arranged to jut out from the end portion of the other side of the mandrel M. Subsequently, when the jut-out parts Fa of the fiber bundles are enclosed by the ring guide 200, the supporting units 20 are moved back to the other side. As a result, the fiber bundles F are returned to the other side while being guided outward from the inner side in the radial direction of the ring guide 200. As the supporting units 20 are further moved to the other side, the sticking of the fiber bundle F can be continued. Therefore, the fiber bundle F is continuously stuck on the mandrel M by the reciprocal movement of the mandrel M. Furthermore, when a pitch carbon fiber bundle which is easily broken is handled, the fiber bundle F is smoothly returned by the ring guide 200 which is circular in cross section, with the result that the fiber bundle F is suppressed from being broken.

By connecting the guide pieces 201 and 202, it is possible to enclose the fiber bundles F from the outer side in the radial direction of the ring guide 200 while forming the ring guide 200. In other words, when the fiber bundles F are enclosed by the ring guide 200, the fiber bundles F are suppressed from making a contact with the ring guide 200. As a result, damage to the fiber bundles F is suppressed.

Because the ring guide 200 is ring-shaped (i.e., has a smooth shape on the whole), damage to the fiber bundle F is suppressed.

Because the outer diameter of the ring guide 200 is substantially identical to the diameter of the mandrel M, the ring guide 200 is suppressed from protruding to the outside as compared to the mandrel in the radial direction, in a state in which the fiber bundles are enclosed by the ring guide 200. Therefore, when the supporting units 20 are returned, the ring guide 200 is suppressed from interfering with, e.g., the pressing roller 54.

The following will describe modifications of the above-described example. The members identical to those in the example described above will be denoted by the same reference numerals, and the explanations thereof are not repeated.

(1) In the example described above, the roller end parts 55b and 55c of the pressing roller 54 of the fiber bundle guide unit 50 are cylindrical in shape. However, this disclosure is not limited to this. In the radial direction of the pressing roller 54, the roller end part 55b may be placed on the inner side of the tangent 101. The roller end part 55c may be similarly arranged.

(2) In the example described above, the roller end parts 55b and 55c of the pressing roller 54 are shaped to suppress the fiber bundle F from being peeled off. However, this disclosure is not limited to this. In other words, the reduced diameter part 55a may be formed to reach the end portions of the pressing roller 54. In the structure described above, for example, the fiber bundle F may be suppressed from being peeled off by adjusting the positional relationship between the pressing roller 54 and the mandrel M by using the guide movement mechanism 80.

(3) In the example described above, the pressing roller 54 includes the reduced diameter part 55a. However, this disclosure is not limited to this. For example, the entire pressing roller 54 may be cylindrical in shape.

(4) In the example described above, the pressing roller 54 is supported at both sides by the pressing roller supporter 52. However, this disclosure is not limited to this. The pressing roller 54 may be cantilevered.

(5) In the example described above, the plate spring members 71 and 72 of the pressing roller supporter 52 function as supporting members which support the pressing roller 54 and cushioning members which absorb the variation of the pressing force. However, this disclosure is not limited to this. The pressing roller supporter 52 may include a supporting member and a cushioning member which are independent from each other.

(6) In the example described above, the widening roller 53 provided at the guide supporter 51 of the fiber bundle guide unit 50 is equivalent to the tension receiving member. However, this disclosure is not limited to this. For example, instead of the widening roller 53, a fixed tension receiving member may be provided at the lower members 64 and 65 of the guide supporter 51. In the structure, when a fiber bundle which is elastic and not easily broken is used, the tension of the fiber bundle can be received.

Alternatively, the tension receiving member may not be provided at the guide supporter 51. In the structure, for example, the tension of the fiber bundle may be kept low by moving the mandrel M slowly so that an influence on the pressing force of the pressing roller 54 may be suppressed.

(7) In the example described above, the mandrel M has a cylindrical shape. However, this disclosure is not limited to this. For example, when the outer diameter of the mandrel M changes in the axial direction, the guide movement mechanism 80 may be activated in the sticking of the fiber bundle F and the position of the fiber bundle guide unit 50 may be adjusted to cause the pressing roller 54 to generate constant pressing force.

(8) In this example, the helical winding unit 40 includes the guide movement mechanism 80, and is able to stick the fiber bundles F on mandrels M with various outer diameters. However, this disclosure is not limited to this. For example, in the helical winding unit 40 which sticks the fiber bundles F only on a mandrel M having a predetermined outer diameter, the guide movement mechanism 80 may be omitted for cost reduction.

(9) In this example, the ring guide 200 used in the sticking of the fiber bundle F in a reciprocating manner is separable into the two guide pieces 201 and 202. However, the ring guide 200 may be separable into three or more. In addition to that, guide pieces may not be completely separated and, for example, the guide pieces may be partially connected by a hinge.

Figure 17A:
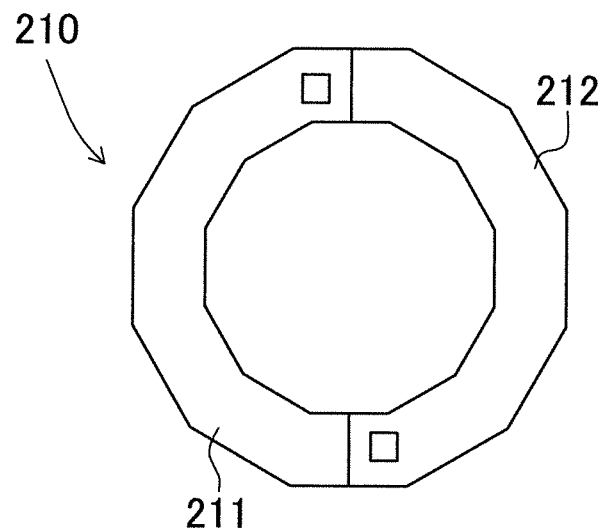
FIGS. 17A and 17B show the ring guide related to a modification.

(10) In the example described above, the ring guide 200 is ring-shaped. However, this disclosure is not limited to this. For example, as shown in FIG. 17A, a ring guide 210 having a dodecagon shape may be used (in this regard, the ring guide 210 is separable into two guide pieces 211 and 212). In other words, the fiber bundle F may be returned by a guide tool that is not limited to ring-shaped but annular ("annular" means a shape which is able to enclose the fiber bundles F such as a polygon ring) in shape. In this regard, preferably, the maximum outer diameter (i.e., the size between apexes in the radial direction) of the ring guide 210 is equal to or shorter than the outer diameter of the mandrel M to suppress the ring guide 210 from interfering with the pressing roller 54.

Figure 17B:
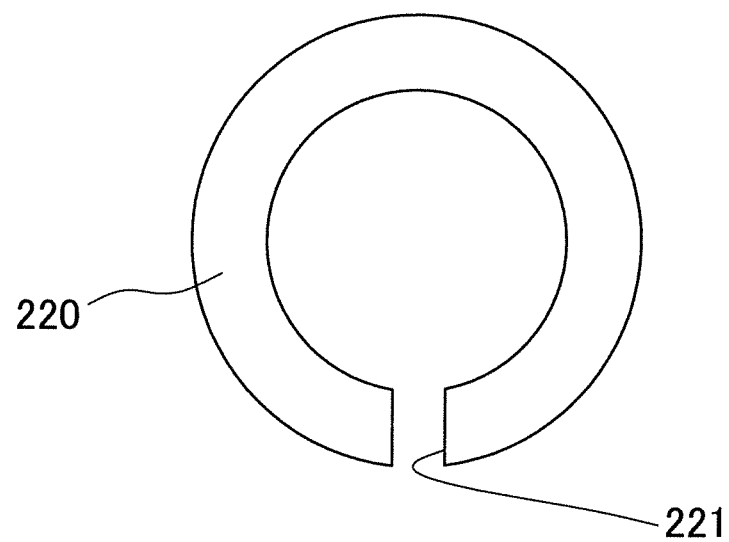

(11) In the example described above, the ring guide 200 can be separated. However, this disclosure is not limited to this. For example, as shown in FIG. 17B, a ring guide 220 may have a slit 221, and may enclose the fiber bundles F by guiding the fiber bundles to the inside of the ring. The shape of this ring guide 220 is also annular. In this example, the fiber bundles F need to be handled carefully, for example, by hand to not damage the fiber bundles F when the fiber bundles F are enclosed by the ring guide 220.

(12) In the example described above, the fiber bundle F is returned by, e.g., the ring guide 200. However, this disclosure is not limited to this. For example, the fiber bundle F may be stuck in a reciprocating manner as described below. After the fiber bundle F is stuck to the rear end portion from the front end portion of the mandrel M, the fiber bundle F is cut and the mandrel M is rotated a little. Subsequently, the tip portion of the fiber bundle F which has not been stuck on the mandrel M is fixed to the rear end portion of the mandrel M. Subsequently, the fiber bundle F is stuck to reach the front end portion from the rear end portion of the mandrel M by moving the mandrel M to the rear side from the front side. By repeating the above-described operation, the fiber bundle F may be stuck on the mandrel M.

(13) In this example, in the sticking, the mandrel M is moved in the axial direction without being rotated. Alternatively, by moving the mandrel M in the axial direction while rotating the same a little, a layer which is tilted a little from the axial direction may be formed.

Figure 18:
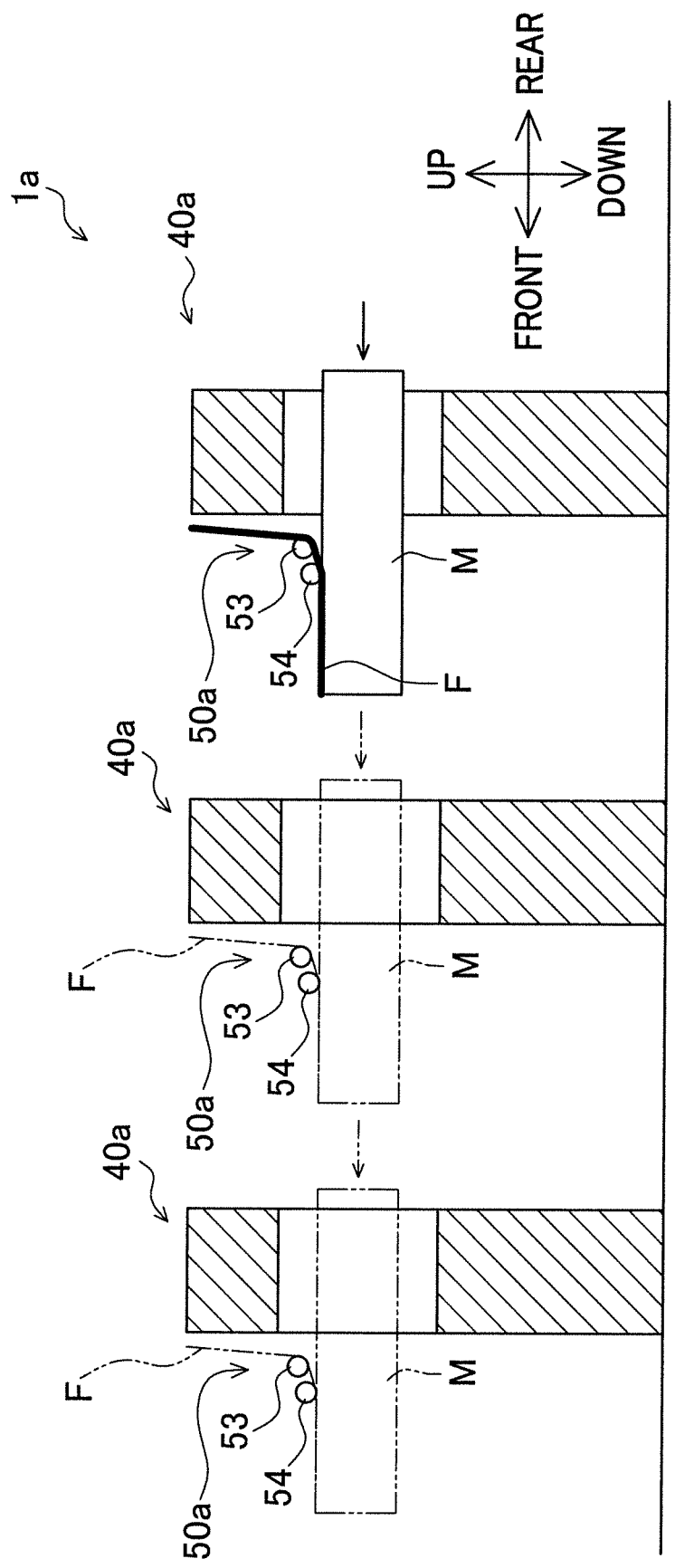
FIG. 18 shows a filament winding device related to another modification.

(14) In the example described above, the supporting units 20 are able to reciprocate, and the fiber bundle guide unit 50 includes the two pressing rollers 54F and 54R. However, this disclosure is not limited to this. In other words, as shown in FIG. 18, the filament winding device 1a may be provided with helical winding units 40a aligned in the front-rear direction, and a fiber bundle guide unit 50a attached to each helical winding unit 40a may include only one pressing roller 54. Because of this, by the helical winding units 40a, the 0-degree oriented layer may be formed on the whole circumference of the mandrel M.

The invention claimed is:

1. A filament winding device comprising:
a supporting unit able to support a mandrel on which fiber bundles impregnated with resin are wound and move in an axial direction of the mandrel; and
a helical unit that includes fiber bundle guide units disposed radially in a circumferential direction of the mandrel and guide the fiber bundles to the mandrel, respectively, the helical unit supplying the fiber bundles to the mandrel via the fiber bundle guide units,
each of the fiber bundle guide units including at least one pressing roller that presses the fiber bundle supplied to the mandrel on a circumferential surface of the mandrel moving in the axial direction, and
the at least one pressing roller being passively rotatable about a roller axis extending in a roller axial direction orthogonal to the axial direction, by contacting the circumferential surface of the mandrel.

2. The filament winding device according to claim 1, wherein each of the fiber bundle guide units further includes a tension receiving member placed upstream of the at least one pressing roller in a fiber bundle running direction and receives tension of the fiber bundle not pressed on the mandrel yet.

3. The filament winding device according to claim 2, wherein, the tension receiving member is a roller.

4. The filament winding device according to claim 1, wherein the helical unit further includes a guide movement mechanism that moves each of the fiber bundle guide units in a radial direction of the mandrel.

5. The filament winding device according to claim 1, wherein the supporting unit is able to reciprocate in the axial direction,
each of the fiber bundle guide units includes two or more pressing rollers,
as the two or more pressing rollers,
a first pressing roller that presses the fiber bundle on the circumferential surface of the mandrel when the supporting unit moves toward one side in the axial direction, and
a second pressing roller placed on the other side of the first pressing roller in the axial direction and presses the fiber bundle on the circumferential surface of the mandrel when the supporting unit moves toward the other side in the axial direction are provided.

6. The filament winding device according to claim 1, wherein the mandrel has a cylindrical shape extending in the axial direction, and
the at least one pressing roller includes,
in cross section including an axis of the at least one pressing roller,
a reduced diameter part curved so that the diameter decreases toward the center in the roller axial direction.

7. The filament winding device according to claim 6, wherein, in the at least one pressing roller, roller end parts are formed at outer sides of the reduced part in the roller axial direction, respectively, and
in the cross section of the at least one pressing roller,
in a radial direction of the at least one pressing roller, the roller end parts are inside tangents to an outer edge of the reduced diameter part at ends in the roller axial direction, respectively, and
an angle formed between each outer edge of the roller end parts and the outer edge of the reduced diameter part is an obtuse angle.

8. The filament winding device according to claim 7, wherein the roller end parts are rectangular in the cross section.

9. The filament winding device according to claim 1, wherein each of the fiber bundle guide units further includes
a roller supporter supporting the at least one pressing roller to be rotatable; and
a guide supporter to which the roller supporter is attached, and
the roller supporter includes
a cushioning member absorbing variation of pressing force of pressing the at least one pressing roller on the mandrel.

10. The filament winding device according to claim 9, wherein the roller supporter includes, as the cushioning member, a plate spring member supporting the at least one pressing roller to be rotatable.

11. The filament winding device according to claim 9, wherein the roller supporter supports the at least one pressing roller at both sides.

12. The filament winding device according to claim 5, further comprising a controller controlling the supporting unit, and after the controller moves the supporting unit to the one side in the axial direction to stick the fiber bundles to reach an end portion on the other side from an end portion on one side in the axial direction of the mandrel, the controller moves the supporting unit further to the one side in the axial direction so that a part of each of the fiber bundles supplied to the mandrel juts out from the end portion on the other side of the mandrel, and the controller moves the supporting unit back to the other side in the axial direction, in a state in which jut-out parts of the fiber bundles jutting out from the end portion of the mandrel are enclosed by an annular returning guide tool.

13. The filament winding device according to claim 12, wherein the returning guide tool is separated into guide pieces in a circumferential direction of the returning guide tool.

14. The filament winding device according to claim 12, wherein the returning guide tool is ring-shaped.

15. The filament winding device according to claim 12, wherein the maximum outer diameter of the returning guide tool is shorter than the outer diameter of the mandrel.

\* \* \* \* \*